US012702249B2

(12) United States Patent
Kleemann et al.

(10) Patent No.: US 12,702,249 B2
(45) Date of Patent: Aug. 11, 2026

(54) KITCHEN APPLIANCE

(71) Applicant: DE'LONGHI BRAUN HOUSEHOLD GMBH, Neu-Isenburg (DE)

(72) Inventors: Christof Kleemann, Neu-Isenburg (DE); Daniel Lebsack, Neu-Isenburg (DE); Christoph Eissengarthen, Neu-Isenburg (DE); Johanna Schwinn, Neu-Isenburg (DE); Jara Freund, Neu-Isenburg (DE)

(73) Assignee: DE'LONGHI BRAUN HOUSEHOLD GMBH, Neu-Isenburg (DE)

( * ) Notice: Subject to any disclaimer, the term of this patent is extended or adjusted under 35 U.S.C. 154(b) by 0 days.

(21) Appl. No.: 18/745,046

(22) Filed: Jun. 17, 2024

(65) Prior Publication Data

US 2024/0335057 A1 Oct. 10, 2024

Related U.S. Application Data

(62) Division of application No. 18/275,466, filed as application No. PCT/EP2022/052584 on Feb. 3, 2022, now abandoned.

(30) Foreign Application Priority Data

Feb. 3, 2021 (GB) ..................................... 2101500

(51) Int. Cl.

| | |
|---|---|
| ***A47J 36/16*** | (2006.01) |
| ***A44B 1/38*** | (2006.01) |
| ***A47J 36/10*** | (2006.01) |
| ***A47J 43/044*** | (2006.01) |
| ***A47J 43/10*** | (2006.01) |

(Continued)

(52) U.S. Cl.

CPC ................. *A47J 36/16* (2013.01); *A44B 1/38* (2013.01); *A47J 36/10* (2013.01); *A47J 43/044* (2013.01); *A47J 43/10* (2013.01); *F16B 21/06* (2013.01); *F16B 41/005* (2013.01); *F16C 9/00* (2013.01);

(Continued)

(58) Field of Classification Search

CPC ................................ A47J 43/044; A47J 43/07

See application file for complete search history.

(56) References Cited

U.S. PATENT DOCUMENTS 2,639,904 A * 5/1953 Mcmaster ............. A47J 43/044 416/176
2,781,175 A 2/1957 Metzer (Continued)

FOREIGN PATENT DOCUMENTS

DE 1429176 A1 10/1968
DE 102006030220 A1 1/2008

(Continued)

OTHER PUBLICATIONS

Cuisinart Classic Food Processors. (C) 2007 youtube.com/watch?v=b4bVsv1eiOE (Year: 2007).*

(Continued)

*Primary Examiner* — Sean M Michalski

(74) *Attorney, Agent, or Firm* — Harness, Dickey & Pierce, PLC

(57) ABSTRACT

A device is disclosed for peeling foodstuffs, the device comprising a rotatable disc having a first friction surface; and a second, preferably friction, surface encircling the first friction surface. Other embodiments are also disclosed.

15 Claims, 15 Drawing Sheets

(51) Int. Cl.
*F16B 21/06* (2006.01)
*F16B 41/00* (2006.01)
*F16C 9/00* (2006.01)
(52) U.S. Cl.
CPC . *A47J 2043/04409* (2013.01); *F16B 2200/00* (2018.08)

(56) References Cited

U.S. PATENT DOCUMENTS 2,952,287 A 9/1960 Clasen
2,980,405 A * 4/1961 Schwaneke ........... A47J 43/044 366/344
3,299,924 A * 1/1967 Hanschitz ............. A47J 43/044 366/279
3,556,303 A * 1/1971 Diebold ................ A47J 19/027 210/380.1
3,595,093 A * 7/1971 Du Bois ............ B23D 57/0076 366/349
3,596,692 A * 8/1971 Swanke ................ A47J 43/046 366/205
3,619,754 A * 11/1971 Fuchs .................... H01H 13/08 366/331
3,660,741 A * 5/1972 Walter .................. A47J 43/082 200/80 R
3,677,314 A 7/1972 Plana
3,784,118 A * 1/1974 Hurwitz ................ A47J 43/046 366/205
3,821,902 A * 7/1974 Du Bois .............. B23D 49/006 366/349
4,073,056 A * 2/1978 Schaeffer ................ A47J 17/14 30/123.5
4,111,372 A * 9/1978 Hicks .................. A47J 43/0772 241/37.5
4,176,971 A 12/1979 Ernster et al.
4,213,569 A * 7/1980 Amiot ................. A47J 43/0761 241/37.5
4,386,740 A * 6/1983 Van Deursen ........ A47J 43/255 241/285.2
4,575,255 A * 3/1986 Kafka ................... H02J 7/0042 366/601
4,586,257 A * 5/1986 Rittenhouse ......... A01D 34/733 403/353
4,645,352 A * 2/1987 Valbona ................ A47J 43/044 366/349
4,850,699 A * 7/1989 Rebordosa ............ A47J 43/044 366/279
5,368,384 A * 11/1994 Duncan ............... A47J 43/0705 366/601
5,533,801 A * 7/1996 Safont ................... A47J 43/085 241/199.12
5,556,203 A * 9/1996 Filias ...................... B01F 35/60 366/347
5,567,047 A * 10/1996 Fritsch .................. A47J 43/082 403/325
6,079,865 A * 6/2000 Plavcan .................. B01F 27/13 200/16 R
6,185,826 B1 * 2/2001 Lutz ........................ B26B 7/005 30/277.4
6,293,691 B1 * 9/2001 Rebordosa ........... A47J 43/0711 366/129
6,374,500 B2 * 4/2002 Stein ..................... A47J 43/288 30/342
6,434,836 B1 * 8/2002 Olivares ................... B26B 7/00 30/DIG. 1
6,591,742 B1 * 7/2003 Leonor .................... A23N 7/00 99/589
6,637,681 B1 * 10/2003 Planca ................ A47J 43/0777 241/37.5
6,712,412 B2 * 3/2004 Kahler .................... A47J 45/07 220/759
6,811,298 B2 * 11/2004 Penaranda ............ A47J 43/082 403/325
6,955,117 B2 * 10/2005 Naud ................... A47J 43/0711 366/279
6,974,244 B1 * 12/2005 Lin ..................... A47J 43/0705 366/331
7,066,639 B2 * 6/2006 Naud .................... A47J 43/082 99/348
7,371,003 B2 * 5/2008 Hamelin .............. A47J 43/0711 366/129
7,458,715 B2 * 12/2008 Garcia .................. A47J 43/082 403/329
7,836,822 B2 * 11/2010 Cheng ...................... B26D 3/26 83/30
8,746,957 B2 * 6/2014 Garman ............... A47J 43/0711 220/839
9,138,102 B2 * 9/2015 Rosenwirth ........... A47J 43/082
9,572,457 B2 2/2017 Ryan
10,369,534 B2 * 8/2019 Davis .................. B01F 33/5011
10,893,775 B2 * 1/2021 Sapire ................. A47J 43/0722
2002/0176320 A1 * 11/2002 Wulf ................... A47J 43/0727 366/205
2003/0097759 A1 * 5/2003 Bond .................... A47J 43/288 30/340
2003/0156899 A1 * 8/2003 Penaranda ............ A47J 43/082 403/325
2003/0173435 A1 9/2003 Hernandez
2006/0272466 A1 * 12/2006 Atwater ................... B26D 3/24 83/932
2007/0257143 A1 * 11/2007 Gregory ................... B26D 7/26 241/92
2010/0199823 A1 * 8/2010 Dalla Piazza .......... B26D 3/283 83/437.2
2011/0162986 A1 * 7/2011 Garman .............. A47J 43/0705 206/320
2011/0232505 A1 * 9/2011 Rosenwirth ......... A47J 43/0705 29/428
2011/0258785 A1 * 10/2011 Diabate ................... A47J 44/00 7/113
2011/0265664 A1 * 11/2011 Goncalves .......... A47J 43/0716 241/292.1
2011/0265665 A1 * 11/2011 Goncalves ............... B26D 1/29 99/538
2012/0310243 A1 * 12/2012 Stratton ................ A61F 2/4644 606/79
2019/0000273 A1 * 1/2019 Sapire ................... A47J 43/085
2024/0358197 A1 * 10/2024 Proulx .................. B01F 35/751

FOREIGN PATENT DOCUMENTS

EP 3287056 B1 4/2019
JP 2001103946 A 4/2001
JP 2004337524 A 12/2004
WO 2013/097702 A1 7/2013
WO 2020/075211 A1 4/2020

OTHER PUBLICATIONS

Rejection Notice for Japanese Patent Application No. 2023-546460 dated Aug. 27, 2024 (with English translation) (15 pages).
Communication pursuant to Article 94(3) EPC dated May 8, 2025 received in EP application No. 24181543.0 (7 pages).
Rejection Notice dated May 27, 2025 received in JP Patent application No. 2024-203366 with English translation (6 pages).
International Search Report and Written Opinion of the ISA issued in PCT/EP2022/052584, mailed Jul. 1, 2022; ISA/EP.
LU Search Report and Written Opinion of the Intellectual Property Office issued in Application No. LU102903, dated Sep. 1, 2022.
LU Search Report and Written Opinion of the Intellectual Property Office issued in Application No. LU102474, dated Dec. 8, 2021.

* cited by examiner 200
250
7126
930
230
910
210
7116
920
900
7128
7112
7100
7110
300
130
330

200
250
7126
230
210
7116
920
900
7128
7100
7112
7110
300
130
330

560
544a
540
562
568
500
548
522
610
546
520
580
510
600

566
562
568
500
544a
540
548
522
546
510
520

KITCHEN APPLIANCE

CROSS-REFERENCE TO RELATED APPLICATIONS

This application is a divisional of U.S. patent application Ser. No. 18/275,466, filed Aug. 2, 2023, which is a U.S. National Phase Application under 35 U.S.C. 371 of International Application No. PCT/EP2022/052584, filed Feb. 3, 2022, which claims the benefit of Luxembourg Application No. LU102474, filed Feb. 3, 2021, Great Britain Application No. 2101500.3, filed Feb. 3, 2021, and Luxembourg Application No. LU102903, filed Feb. 3, 2021. The entire disclosure of each of the above-identified applications is incorporated herein by reference.

FIELD

The present invention relates to attachments for kitchen appliances, in particular handheld kitchen appliances such as a hand blender or immersion blender. The invention relates in particular to an attachment for peeling of garlic or similar foodstuffs, and to a manner of ejecting tools from attachments.

SUMMARY OF INVENTION

According to a first aspect of the invention, there is provided a device for peeling foodstuffs, the device comprising: a rotatable disc having a first friction surface; and a second, preferably friction, surface encircling the first friction surface.

As used herein, 'encircling' preferably connotes surrounding the perimeter, without being limited to a circular configuration. Encircling also preferably connotes that the first friction surface and second surface are non-parallel.

Preferably at least part of the first friction surface and second surface are at an angle between 45 and 135 degrees, more preferably between 60 and 120 degrees, more preferably between 75 and 105 degrees, more preferably between 80 and 100 degrees, and even more preferably between 85 and 95 degrees. The at least part of the first friction surface and second surface may desirably be perpendicular.

Preferably the second surface is a wall surrounding the first friction surface, and more preferably the second surface abuts the first friction surface.

In a preferable configuration, the first friction surface and the second surface define a chamber to accommodate the foodstuff, and both the first friction surface and second surface face the chamber. Preferably, the chamber is a not totally enclosed by the first friction surface and second surface. More preferably, the chamber has an entrance aperture and the first friction surface faces the entrance aperture.

The second surface may be provided on a cylinder within which the disc (including or forming the first friction surface) is located. The cylinder may preferably be tapered.

One or both of the first friction surface and second surface may preferably have an outer surface formed from a resilient material. For example, the outer surface may be formed of rubber, silicone or similar polymer. The first and second surfaces are preferably not abrasive or cutting surfaces comprising rough or sharp particles, grains or teeth, which may scratch, cut or penetrate the skin of a foodstuff. Preferably the surfaces do not scratch or penetrate the skin of a foodstuff, for example garlic cloves, but preferably grip it. Preferably the friction surface has a smooth outermost surface.

There is preferably a higher coefficient of friction between the first friction surface and the foodstuff to be peeled than between the foodstuff to be peeled and the remainder of the disc and/or the second surface.

The second surface may comprise formations, which preferably impede the motion of the foodstuff to be peeled. The coefficient of friction between the second surface and the foodstuff may be no higher than for an ordinary surface of a kitchen appliance, for example the bowl of a kitchen appliance. In an alternative, the second surface may be provided as or on a sleeve for covering said formations.

As the friction surfaces are not parallel, foodstuff to be peeled, such as garlic cloves, do not need to have similar sizes for peeling to be effective.

The device may be formed by the engagement of an appliance and an attachment.

Alternatively, the device may be an attachment for another appliance, such as a kitchen appliance; or it may be a standalone appliance itself.

The second surface is not required to completely surround or encircle the first friction surface. It is preferable that the second surface surrounds the first friction surface to a sufficient extent to contain a foodstuff to be peeled, and preferably to prevent the foodstuff from escaping.

In a preferable configuration, the disc is rotatable about an axis and the second surface faces the axis. As used herein, preferably the term 'faces' is used to connote that the surface normal points towards the axis. The normal may meet the axis at any angle. When the disc is rotated, the foodstuff may undergo centrifugal forces which drive it outwards from the axis. In this configuration, the foodstuff may preferably be driven to the second surface. The second surface may be the inner surface of a container or bowl. The disc may be attached to a shaft, preferably aligned with the axis, wherein the shaft may receive drive thereby to allow the disc to be rotated.

Preferably the second surface is provided at an angle within 45 degrees of the axis, more preferably within 30 degrees, more preferably within 15 degrees, more preferably within 10 degrees, and even more preferably within 5 degrees.

Preferably the disc is rotatable relative to the second surface. The second surface may be stationary. The relative motion may preferably provide shear forces on the surface of the foodstuff, which may assist in peeling.

The foodstuff to be peeled may not be restrained between the first friction surface and the second surface. As the first friction surface and the second surface are not parallel, preferably the foodstuff is not restrained between them, such that it can move under the centrifugal force caused by rotary motion. The engagement of the foodstuff with the first friction surface is preferably due to gravity. The engagement of the foodstuff with the second surface is preferably a result of centrifugal forces. Accordingly, the device may be capable of peeling foodstuffs of assorted size.

The first friction surface and/or the second surface may comprise a frictional coating and/or patterning. The frictional coating may be formed of a resilient material such as rubber, silicone, or similar polymer, which preferably may act to grip the foodstuff. Surface patterning may be shaped as raised or recessed ribs, diamonds, cross-hatching, dots, or other patterns. The patterning preferably has a smooth surface and/or is on a scale such that abrasion is minimal, or more preferably does not occur.

The second friction surface may be provided on a sleeve for use in a container for a kitchen appliance. The use of such a sleeve may allow the device to form part of or be used in a (container of a) existing kitchen appliance, which may be adapted for other uses. In particular, the sleeve may cover formations in a wall of a kitchen appliance. The sleeve may thereby present a second friction surface which does not include substantial protrusions or discontinuities (or includes less prominent protrusions or discontinuities), which may assist in preventing damage to foodstuff during operation of the device. The disc may contact or extend very close to the sleeve in use.

The sleeve may be formed as a rigid sleeve having first and second open ends. The first open end may allow for the rotatable disc to be engaged with a drive and optionally may allow foodstuff to be inserted into the sleeve. The rigid sleeve may be formed with a shoulder connecting a side of the sleeve and the first open end, such that the rigid sleeve forms a 'bell' shape. The rigid sleeve may be formed of a rigid plastics material or a rigid elastomeric material.

The sleeve may be formed as a deformable and/or relatively soft sleeve. Such a sleeve may consist only of a side wall (i.e. it may not include top or bottom walls). Such a sleeve may be used as a peeler for foodstuff independently of the device, specifically by being deformed by a user such that the second friction surface contacts foodstuff placed within the sleeve from at least two sides of the foodstuff, and then by being moved relative to the foodstuff such that the foodstuff is peeled. The deformable sleeve may be formed of a soft silicone, thermoplastic elastomer, or elastomeric material.

The rotatable disc may comprise portion arranged at an oblique angle relative to the second friction surface and/or a further (flat) portion of the disc, wherein the first friction surface extends over said portion; preferably wherein said portion is conical in shape. Said portion is preferably located centrally in the disc. The obliquely arranged portion may take up between one quarter and three quarters of a radius of the disc, and preferably takes up around one half of a radius of the disc. The obliquely arranged portion may extend over a major part of a/the (central) shaft attached to the disc, preferably wherein the obliquely arranged portion extends over substantially all of a/the (central) shaft attached to the disc. The obliquely arranged portion may be arranged at an angle, relative to an outer/flat part of the disc, of between 90 and 135 degrees, more preferably between 100 and 125 degrees, and still more preferably between 105 and 120 degrees. The obliquely arranged portion and the outer/flat part of the disc may be coated in a soft material such as silicon or thermoplastic elastomer, preferably via a two-part injection moulding process. The use of a obliquely arranged portion may reduce the amount of radial movement of foodstuff in use, which may thereby make it more likely that the foodstuff contacts the second friction surface so as to be effectively peeled and may also reduce damage to the foodstuff in use. Although the obliquely arranged portion is generally described as 'conical', it will be appreciated that portions having different shapes (e.g. a rounded or curved cone shape or a hemispherical shape) could instead be used.

The first friction surface may be reversibly attachable to the disc. This can enable the first friction surface to be removed for cleaning. The friction surface can be replaced if it becomes worn or damaged.

Preferably the disc may have an alternative food processing purpose. Storage space may be minimized if the first friction surface can be attachable to a disc (for example a grating disc) to convert the food processing purpose to peeling.

The device may comprise a cavity beneath the first frictional surface and the disc may comprise apertures which extend through to the cavity. In some configurations, the apertures may be sufficiently large to receive garlic skins. Preferably, the apertures are not sufficiently large to receive garlic cloves (garlic cloves are usually of a size between 1 cm to 3 cm). Preferably the apertures do not have an uninterrupted opening greater than 1 cm. This may assist in separating peeled cloves and skins.

In a preferable configuration, the disc comprises inner and outer portions, and apertures are provided on both the inner and outer portions. This can assist in creating an airflow within the device, for example through the cavity.

Preferably the apertures on the outer portion are on the perimeter of the disc. This can prevent the apertures from becoming blocked by the cloves.

There may grilles provided across at least some of the apertures. For configurations in which apertures are intended for air flow, preferably grilles can prevent the peeled skins being drawn into the cavity by the air flow. Grilles may be provided across only the apertures provided on the inner portions, or only the apertures provided on the outer portions, or on apertures on both the inner and outer portions. Preferably the spacing of the grilles is no greater than 1 cm.

The cavity may comprise ribs for directing air flow. The ribs are preferably configured to encourage air flow between apertures. In a preferable example, the ribs are configured to encourage air flow from the inner portion to the outer portion. Preferably, the ribs are curved. Even more preferably, the ribs are curved away from the direction of rotation, in that the radius of curvature extends opposite to the direction of rotary motion. This may encourage the skins to accumulate on an inner portion of the disc, and the peeled cloves to accumulate on an outer portion of the disc.

Preferably, the apertures on the outer portion of the disc are located between the ribs. In this way, air may flow between the ribs and directly out of the apertures.

Preferably the device further comprises a cover rotatable in conjunction with the disc. The cover can provide vertical constraint on the movement of the foodstuff. In a preferred embodiment, the cover is freely movable to vary the distance between the disc and the cover. In this manner, the height of the chamber may be changed, so that different sized cloves can be accommodated. Preferably, the cover only rests on the foodstuff gently due to gravity.

The cover may be reversibly attachable. Preferably it can be attached to the device and detached from the device repeatedly without causing damage to the cover or the device.

According to a further aspect, there is provided an attachment for a kitchen appliance, comprising a disc configured to convert the appliance into the device for peeling foodstuffs as described above.

A disc attachment with a friction surface may be attached to a food appliance, the friction surface providing the first friction surface as described above. The second surface may be provided by the walls of a bowl or container of a food processing appliance.

According to a further aspect of the invention there is provided an attachment for a rotary food processing appliance, comprising an axle comprising: a first part comprising a rotary tool for food processing; and a second part comprising a cover; wherein the first part and second part are reversibly attachable.

Accordingly, the first part may be placed within a food processing appliance, followed by the foodstuff, and then the second part. The configuration can provide a safety guard. As the rotary tool may keep spinning even after the power has been switched off, in the absence of the cover, a user may be injured by the spinning disc. The cover provides a shield for the rotary tool to help prevent such an injury from occurring.

Preferably, one of the first part or second part is configured to transmit rotary drive from the rotary food processing appliance to the other of the first part or second part. Preferably only when the two parts are assembled is drive transmitted. This provides a further safety guard.

The rotary tool for food processing may be a disc, for example such as a grating disc, a slicing disc, a spiralizer disc, an emulsifier disc, a friction surface disc, or a dough hook, chopper, blender or may have an alternative food processing purpose. The rotary tool may be the disc as previously described.

The device as described above may include such an attachment. The disc as described above may be provided on the first part of the axle, and the cover as described above may be provided on the second part. The foodstuff can preferably be accommodated between the disc and the cover.

According to a further aspect of the invention, there is provided a kitchen appliance comprising the device and/or the attachment as described above.

According to a further aspect of the invention, there is provided a device for peeling foodstuffs, the device comprising: a rotatable disc having a first friction surface; and a second surface surrounding the first friction surface.

According to a further aspect of the invention, there is provided a device for peeling foodstuffs, the device comprising: a disc rotatable about an axis comprising a first friction surface, and a second surface facing the axis. Preferably the second surface is at an angle not greater than 45 degrees to the axis. More preferably, the second surface is at an angle not greater than 30 degrees to the axis. Even more preferably, the second surface is at an angle not greater than 15 degrees to the axis.

According to a further aspect of the invention, there is provided a device for peeling foodstuffs, the device comprising: a rotatable disc having a first friction surface; and a second surface perpendicular to the first friction surface.

According to a further aspect of the invention, there is provided a device for peeling foodstuffs, the device comprising a container and a disc, wherein the disc comprises a friction surface and is rotatable within the container.

According to a further aspect of the invention, there is provided an attachment for a hand blender, the attachment comprising a reversibly attachable tool and an ejector for the reversibly attachable tool.

As the tool can be ejected via an ejector, the user is not required to touch the tool in order to remove it. This helps to prevent accidents which may occur if the user is holding the tool and the tool becomes activated. It can also help to prevent the user from getting foodstuff on their hands when removing the tool.

According to a further aspect, there is provided an attachment for a kitchen appliance, the attachment comprising: a reversibly attachable tool; an ejector for the reversibly attachable tool; and a coupling means for connection to the kitchen appliance; wherein the ejector and the coupling means are located on the same face of the attachment.

As used herein, "the same face" is used to connote the same surface and/or side of the attachment. This may be the uppermost face when in use. The ejector being located on the same face of the attachment as that which couples to the motor of a kitchen appliance may often be more convenient for a user, especially if they are using a handheld kitchen appliance.

Preferably the coupling means comprises a formation configured to engage with a formation of a kitchen appliance to reversibly attach the attachment to the kitchen appliance. Even more preferably, the coupling means is configured to transmit drive from the kitchen appliance to attachment, and preferably to the reversibly attachable tool.

Preferably the ejector and the coupling means are separate. This enables the detachment of the tool from the attachment to take place separately from detachment of the attachment from the kitchen appliance. More preferably, the ejector and coupling means are spaced apart from one another. This space may have a distance of at least 1 cm, preferably at least 2 cm, more preferably at least 3 cm. This helps to prevent the user from activating the ejector by mistake when holding the kitchen appliance.

According to a yet further aspect, there is provided an attachment for a kitchen appliance, comprising a reversibly attachable tool and an ejector for the reversibly attachable tool, wherein the ejector is offset from the axis of tool.

The term 'offset' is used herein to connote that the ejector is preferably activated in an activation direction which is not aligned with the axis of the tool. This configuration can provide space for the tool to be aligned with other features, for example a gear box for transmitting rotary drive. Preferably the activation direction is parallel to the axis of the tool.

Preferably, the reversibly attachable tool and the ejector for the reversibly attachable tool are provided on opposite faces of the attachment. This facilitates the activation direction being parallel to the axis of the tool.

Preferably, the reversibly attachable tool is ejected along an ejection direction, and the ejector comprises an ejection controller activated in an activation direction, the activation direction being parallel to the ejection direction. Preferably the ejection direction along the axis of the tool. This can allow the ejection force to be transmitted more efficiently.

The controller may be a button, a lever, or a switch.

In a preferable configuration, the activation direction may be offset from the ejection direction. This is used to connote that the activation direction is preferably parallel to but not aligned with the ejection direction. This can allow space for further elements within the attachment, for example for coupling the tool to a motor.

The ejector may further comprise an ejection pin for each component part of the tool. The pin may be used to transmit force to eject the tool. Preferably there is more than one ejection pin and the ejection pins have different lengths. The user may therefore eject the tools sequentially, reducing the force required to eject each tool.

In a preferable configuration, the ejector further comprises a guiding formation parallel to the ejection direction. This directs the ejector smoothly downwards and mitigates the effect of any turning moment. The guiding formation may preferably comprise ribs in a direction parallel to the ejection direction.

The guiding formation may preferably be parallel to and along the activation direction. This assists in guiding the ejector smoothly downwards.

Preferably, the guiding formation further comprises struts in a direction perpendicular to the ejection direction. These can strengthen and/or stiffen the ejector mechanism to withstand shear forces, while minimizing weight and volume.

According to a further aspect, there is provided a kitchen appliance comprising: an attachment having a reversibly attachable tool; a first ejection mechanism for the ejection of the attachment from a kitchen appliance; and a second ejection mechanism for the ejection of the reversibly attachable tool from the attachment; wherein the first ejection mechanism is separate from the second ejection mechanism.

Providing two separate ejection mechanisms for the ejection of the attachment and the ejection of the tool allows the appliance to be disassembled in stages. Furthermore, the user does not need to touch the tool(s) in order to remove them.

The attachment of the kitchen appliance may preferably be the attachment as described above.

The kitchen appliance as referred to above may be a handheld kitchen appliance, preferably a hand blender.

According to a further aspect, there is provided a sleeve for use in a device preferably a kitchen appliance, for peeling foodstuff, optionally wherein an inner surface of the sleeve provides a friction surface for peeling foodstuff. The sleeve may be used in combination with a rotating component located inside the sleeve, optionally wherein said rotating component provides a further friction surface.

According to a further aspect, there is provided a rotatable disc for a device, preferably a kitchen appliance, for peeling foodstuff, comprising a first portion; and a second portion arranged at an oblique angle relative to the first portion; preferably wherein a friction surface is provided on at least the second portion; more preferably wherein the second portion is conical in shape.

The invention also encompasses a kit of parts for constructing any of the apparatuses or apparatus elements herein described.

The invention extends to methods, system and apparatus substantially as herein described and/or as illustrated with reference to the accompanying figures.

The invention extends to any novel aspects or features described and/or illustrated herein. Any apparatus feature as described herein may also be provided as a method feature, and vice versa. As used herein, means plus function features may be expressed alternatively in terms of their corresponding structure, such as a suitably programmed processor and associated memory, for example.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

It should also be appreciated that particular combinations of the various features described and defined in any aspects of the invention can be implemented and/or supplied and/or used independently.

In this specification the word 'or' can be interpreted in the exclusive or inclusive sense unless stated otherwise.

As used herein, the term "removable attachment" (and similar terms such as "removably attachable" and "reversibly attachable"), as used in relation to an attachment between a first object and a second object, preferably connotes that the first object is attached to the second object and can be detached (and preferably re-attached, detached again, and so on, repetitively), and/or that the first object may be removed from the second object without damaging the first object or the second object; more preferably the term connotes that the first object may be re-attached to the second object without damaging the first object or the second object, and/or that the first object may be removed from (and optionally also re-attached to) the second object by hand and/or without the use of tools (e.g. screwdrivers, spanners, etc.). Mechanisms such as a snap-fit, a bayonet attachment, and a hand-rotatable locking nut may be used in this regard.

Furthermore, features implemented in hardware may generally be implemented in software, and vice versa. Any reference to software and hardware features herein should be construed accordingly.

Whilst the invention has been described in the field of domestic food processing and preparation machines, it can also be implemented in any field of use where efficient, effective and convenient preparation and/or processing of material is desired, either on an industrial scale and/or in small amounts. The field of use includes the preparation and/or processing of: chemicals; pharmaceuticals; paints; building materials; clothing materials; agricultural and/or veterinary feeds and/or treatments, including fertilisers, grain and other agricultural and/or veterinary products; oils; fuels; dyes; cosmetics; plastics; tars; finishes; waxes; varnishes; beverages; medical and/or biological research materials; solders; alloys; effluent; and/or other substances. Any reference to "food", "foodstuff" or similar terms herein may be replaced by such working mediums.

The invention described here may be used in any kitchen appliance and/or as a stand-alone device. This includes any domestic food-processing and/or preparation machine, including both top-driven machines (e.g. stand-mixers) and bottom-driven machines (e.g. blenders or food processors). It may be implemented in heated and/or cooled machines. The invention may also be implemented in both hand-held (e.g., hand blenders) and table-top (e.g., blenders) appliances. It may be used in an appliance that is built-in to a work-top or work surface, or in a stand-alone device. The invention can also be provided as a stand-alone device, whether motor-driven or manually powered.

As used herein, the term "processing" preferably connotes any action relating to or contributing towards transforming products into foodstuff, or transforming foodstuff into a different form of foodstuff, including—as examples—applying mechanical work (e.g. for cutting, beating, blending, whisking, dicing, spiralizing, grinding, extruding, shaping, kneading etc.) and applying heat or cold. "Food" and "foodstuff" as used herein can include beverages and frozen material and material used in creating them (e.g., coffee beans).

SPECIFIC DESCRIPTION

Peeling Insert

Figure 1:
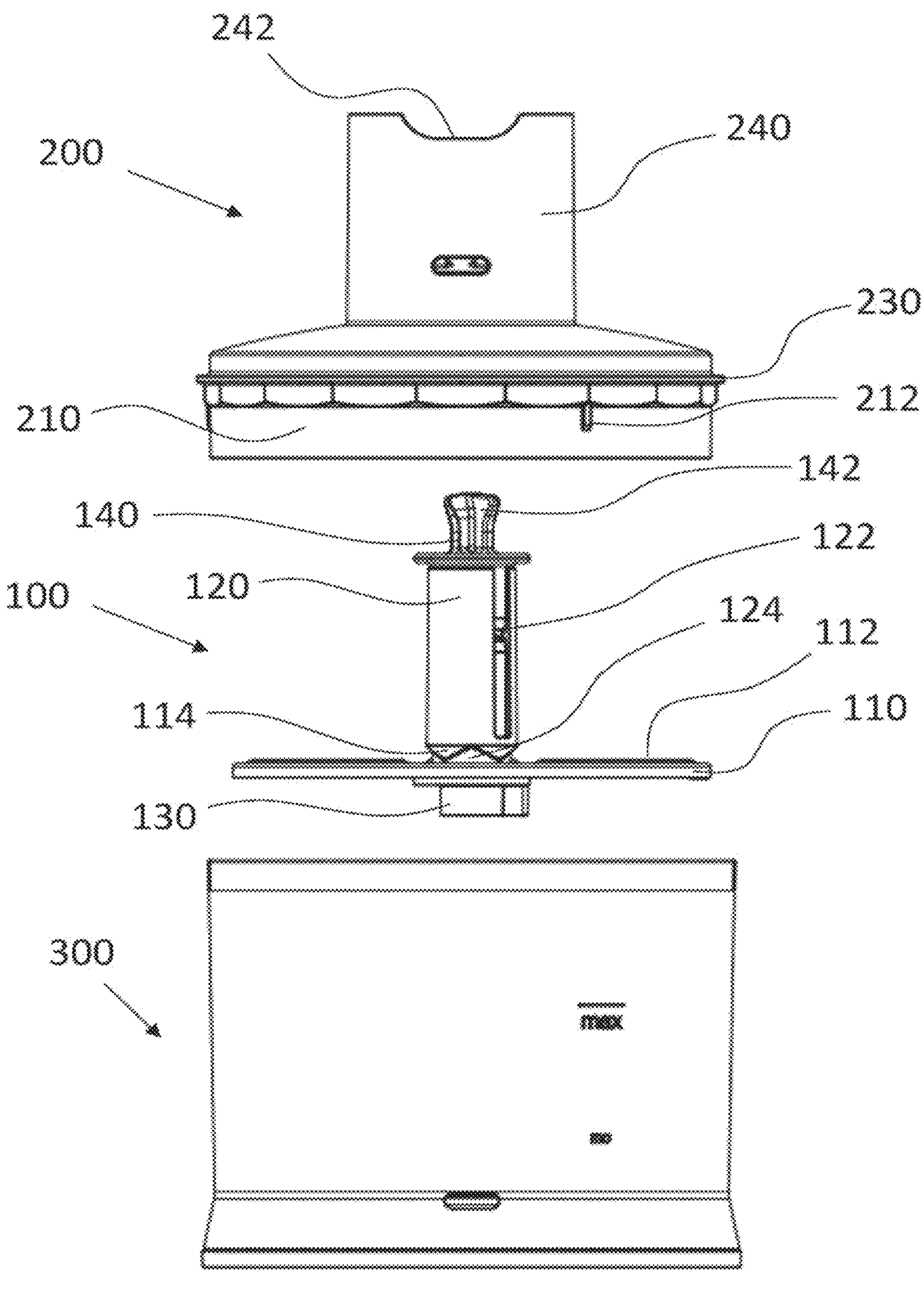
FIG. 1 shows a side-on drawing of a food processing device according to an embodiment of the invention.
Figure 3:
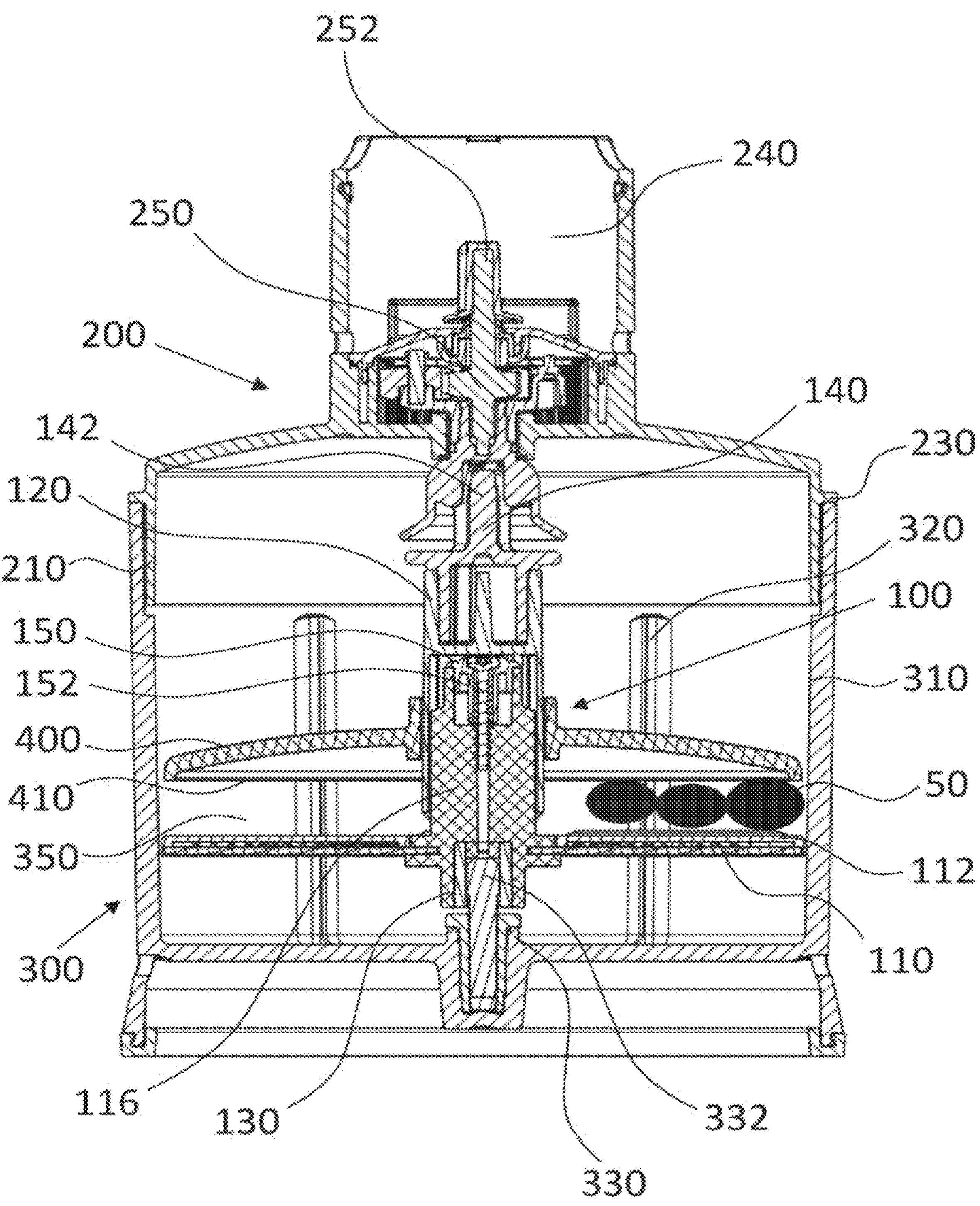
FIG. 3 shows a cross-sectional drawing of the food processing device.

Peeling garlic and similar vegetables can be awkward and deposit a long-lingering smell on the hands of a cook. Therefore, providing motorised peeling of garlic is desirable. FIGS. 1 and 3 illustrate a first embodiment of an invention for peeling garlic in a rotary food processing appliance, comprising a tool attachment 100, a lid 200 and a bowl 300. The attachment comprises a shaft 120 and a disc 110 rotatable within the bowl 300. At the end of the shaft is a means 140 for transmitting drive from a motor unit which is attachable via the lid 200.

Figure 2:
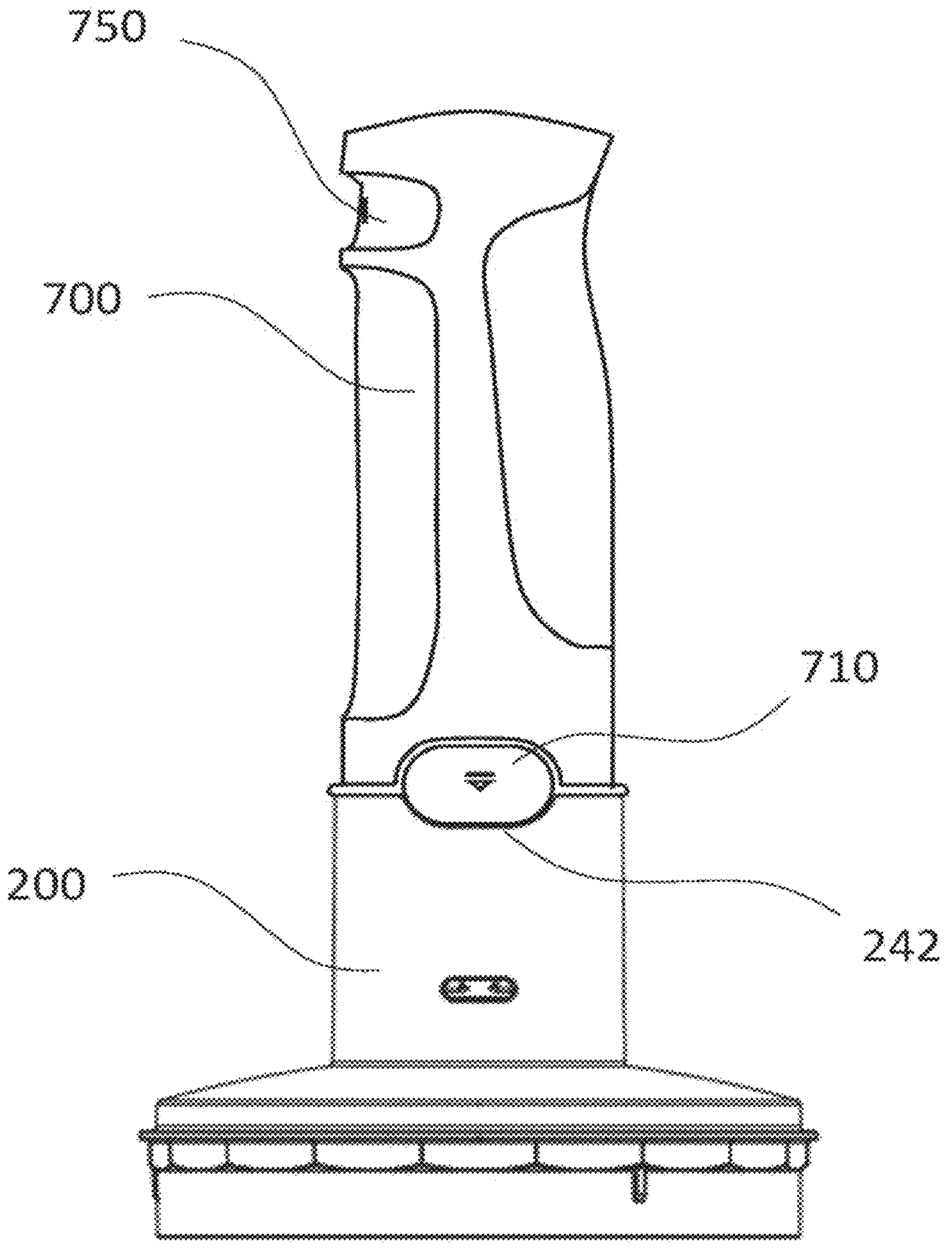
FIG. 2 shows a lid of the food processing device connected to a hand blender shaft.

In this embodiment, the tool 100 is provided as an attachment for a hand blender or immersion blender 700, as illustrated in FIG. 2. The tool attachment 100 comprises a locating post 130 which engages with a corresponding recess 330 at the base of the bowl 300. The tool 100 is configured to be held in a secure position within the bowl 300 through the engagement of the locating post 130 and corresponding recess 330. The recess 330 on the bowl 300 includes a locating pin 332 which slots within a bore on the post 130 on the tool attachment 100. The shaft 120 of the tool 100 is rotatable relative to the locating pin 332 such that the bowl 300 remains in a fixed position while the attachment 100 rotates within it.

The motor unit of the appliance is located within a handle of the hand blender 700, which is attachable to the lid 200. FIG. 2 illustrates the lid 200 in connection with the handle of the hand blender 700. The handle of the blender is received within a channel 240 extending from the upper surface of the lid 200. The lid 200 and the handle of the hand blender have corresponding locking formations to secure the connection, such as a bayonet mechanism and/or snap lock. The upper lip of the channel 240 has cut away portions 242 into which attachment release buttons 710 on the hand blender 700 may be accommodated. Upon activating the attachment release buttons 710 the bayonet and/or snap lock mechanism is disengaged to release the connection of the blender handle 700 and the lid 200.

The hand blender 700 can be powered on by a control 750. The drive transmission mechanism provided in the lid is illustrated in cross-section in FIG. 3. Within the channel 240 there is provided a transmission pin 252 which engages with the motor mechanism located in the handle of the food processing appliance. The transmission pin 252 transmits torque to a transmission mechanism 250 within the lid, which in turn can then transmit torque to the tool. The transmission mechanism 250 transmits the rotary motion of the motor to the tool via engagement with a coupling component 140 located at the end of the shaft 120 of the tool attachment 100. The coupling component 140 comprises spade-shaped formations 142 which engage with the transmission mechanism 250. In this manner, rotary motion is provided to the shaft or axle 120 of the tool 100.

The lid 100 comprises a lower lip 210 projecting from its perimeter which fits within the bowl 300. The lower lip 210 comprises protrusions 212 which engage with corresponding slots (not shown) within the inner surface of the bowl to form a secure connection. The lid may further be connected to the bowl via a bayonet mechanism and/or snap fit mechanism.

The lid 200 further comprises an outwardly projecting rim 230 which covers the join between the lid 200 and bowl 300.

The tool attachment 100 comprises a substantially flat disc 110 located on the shaft 120, such that the disc 110 is rotatable about an axis defined by the shaft 120. When assembled (as illustrated in FIG. 3), the configuration of the tool 100, lid 200 and bowl 300 defines a chamber 350 for receiving food 50 between the upper surface of the disc 110 and the lower surface of the lid 200. The upper surface of the disc 110 comprises a friction surface 112. The inner surface of the bowl 300 forms a second surface 310, which can act as a second friction surface. When garlic cloves 50 (or similar foodstuff to be peeled) are placed within the chamber 350, they sit on the friction surface 112 of the disc 110. The disc 110 rotates within the bowl 300, while the bowl 300 remains stationary.

The disc 110 sits within the bowl 300 so that the second friction surface 310 encircles the disc friction surface 112. The second friction surface 112 abuts the circumference of the disc 110 and its friction surface 112. The angle between the disc friction surface 112 and the second friction surface 310 may be 90 degrees, but this is not necessary for the invention to function correctly. The two friction surfaces 112, 310 are not parallel, but may be provided at a range of angles between 45 degrees and 135 degrees. In the illustrated embodiment, the surfaces 112, 310 are provided at an angle just greater than 90 degrees. The disc friction surface 112 and the bowl friction surface 310 both face the chamber 350 in which the foodstuff to be peeled is accommodated. The disc friction surface 112 faces upwards, and so faces the opening to the chamber 350. As the disc friction surface 112 and the second friction surface 310 are not parallel, the cloves 50 are not restrained between the two friction surfaces. Rather, the cloves 50 are held against the disc friction surface 112 by gravity. When the disc is rotated the cloves 50 are pushed outwards by centrifugal force. As the second friction surface faces the axis of the shaft 120, the centrifugal force pushes the cloves 50 against the second friction surface 310.

Figure 4:
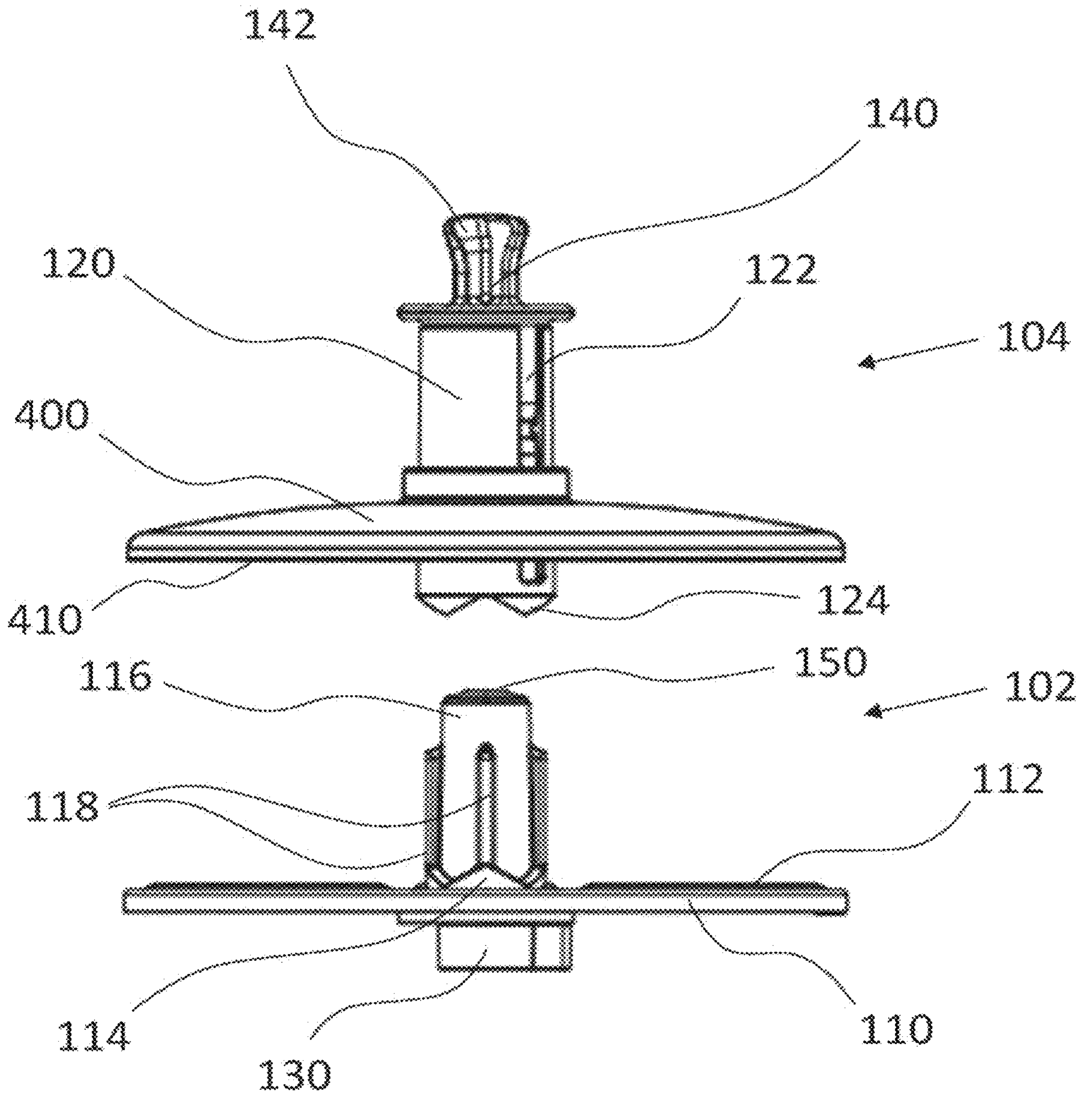
FIG. 4 shows a side-on drawing of the disc insert and cover disc.

The tool 100 is formed as two main components which are separable: the disc insert 102 and the shank attachment 104, as is illustrated in FIG. 4. The disc insert 102 comprises the disc 110 and a shaft 116. The shaft 116 can be accommodated within the shank 120 of the shank insert 104. A cap 150 is secured on the top of the shaft 116 by a screw 152, which closes the shaft 116 and prevents foodstuff from entering. When connected, the shaft 116 and the shank 120 act as an axle for the tool 100. The shaft 116 and the shank 120 comprise corresponding engaging formations so that rotational motion can be transmitted between the components. In the present example embodiment, there are provided splines 118 running along the outer edge shaft 116 which sit within corresponding slots (not shown) within the shank 120. Alternatively, ribs may be provided within the shank extending inwardly and corresponding slots provided on the shaft into which the ribs can be positioned. Engaging formations in the form of teeth 114 and 124 are also provided at the end of the splines, at the interface of the shank 120 and the disc 110. In the present embodiment, the shank attachment 104 transmits rotary motion to the disc insert 102. However, a disc insert component may alternatively be coupled to the motor and transmit drive to the shank insert component.

Further attachments may be attached to the tool insert 100 to improve or alter the mode of food processing. The shank 120 comprises a formation 122 configured to engage with and secure further attachments. In the present embodiment, the formation 122 is provided as a slot running along the length of the shaft 120 (and therefore along the axis of rotation) into which a protruding formation on the further attachment may be inserted. This arrangement allows a further attachment to move freely along the axis of the shaft 120 so that the distance between the disc 110 and the further attachment can be varied. This also facilitates transmission of rotary force to the further attachment so that the further attachment rotates in synchronisation with the rotation of the disc 110.

An example of a further attachment is a cover 400, as illustrated in FIG. 4. The cover 400 has a disc-shaped footprint which corresponds to that of the tool disc 110. The cover 400 acts as a top surface of the chamber 350. As the cover 400 is able to move freely up and down the shaft 120 (along the axis of rotation), the distance between the cover 400 and the disc 110 can be varied and the size of the chamber 350 can be altered. The cover 400 can be allowed to gently rest on top of the garlic cloves 50 and exert a gentle pressure due to gravity. The cover 400 can therefore minimize the size of the chamber 350 in which the cloves 50 are accommodated. Upon powering on the motor, the cover 400 rotates together with the disc 110. During rotation, the centrifugal force exerted on the cloves 50 can cause them to move in a random manner. The cover has the effect of minimizing vertical motion and encouraging lateral motion towards the second friction surface 310. In this manner, the cloves 50 can be urged towards the wall 310 more quickly and efficiently. The cover 400 is preferably made of a food-safe plastic material, having a weight sufficient to restrain but not hinder motion. The cover may therefore have a weight in the order of between 10 and 100 g, preferably between 15 and 35 g, and more preferably between 20 and 30 g; even more preferably it has a weight of 25 g. The lower surface of the cover does not need to be parallel with the friction surface 112 of the disc 110. For example, it may be tilted upwardly from the central portion to the outer portion to encourage the cloves 50 towards the walls 310 of the bowl 300.

In use, the disc insert 102 is placed and secured within the bowl 300, as described previously. After this, the foodstuff 50 to be processed is placed within the chamber 350, on the friction surface 112 of the disc 110. The shank insert 104 is then fitted over the disc insert 102 so that the foodstuff is retained within a chamber 350 defined by the friction surface 112, the walls of the bowl 300, and the cover 400. When the appliance is powered on and the disc 110 is set into rotation by the motor, centrifugal forces will cause the garlic cloves 50 to move to the outer regions of the cavity, towards the second friction surface 310 on the inner walls of the bowl 300. The relative motion of the disc friction surface 112 and the second friction surface 310 exerts shear forces on the surface of the garlic cloves 50, which causes the skins to be removed.

Typically, conventional peeling devices exert shear forces by rubbing the cloves between two parallel surfaces. In such arrangements the width of the gap between those two surfaces is determined by the larger cloves. Therefore, only the larger cloves come into contact with both surfaces and are efficiently peeled. The present invention utilizes gravity to hold the cloves against the disc frictional surface 112 and centrifugal force to engage the cloves with the second frictional surface which surrounds the disc 110. The centrifugal motion acts on cloves of all sizes so that they all come into contact with the friction surfaces. Therefore, both small and large cloves undergo shear forces from the friction surfaces as a result of the rotary motion. As such, cloves of all sizes can be peeled effectively.

A sufficiently high rotational speed of the disc 110 is required to exert sufficient centrifugal force on the cloves 50 that they are flung towards the second friction surface 310. This is typically achieved by rotation at a speed greater than 1,000 RPM, although preferably rotary motion between 1,000 and 5,000 RPM, more preferably between 2500 and 3500 RPM, and yet more preferably 3000 RPM, may more typically be used.

The friction surface 112 is formed of a resilient material such rubber, silicone or similar polymer material. Such a material gives rise to a higher frictional coefficient than materials typically used in tool attachments, for example metal. In order to avoid damaging the garlic cloves (or other foodstuff to be peeled) the upper friction surface of the disc is not formed of an abrasive material having a granular surface configured to scratch or abrade, such as sandpaper. Abrasive materials can damage the surface of the garlic, resulting in the clove being left in a sub-optimal state for cooking. They can often result in juice being released from the garlic clove, so that when the user handles the peeled cloves, the smell may still be deposited on their hands. The friction surface 112 of the present invention has a smooth outermost surface and has an abrasiveness less than that of P1200 sandpaper. In this way, the skin of the foodstuff is removed by rubbing rather than by abrasion. The friction surface may have patterning in the form of either recessed or protruding features. These features may be formed of the same or a different material, and may take forms including ribs, dots, cross-hatching or similar pattern configured to improve grip. The outermost surface of the material from which this patterning is formed can still be considered to be smooth in that it is not formed of granular particles, but a smooth continuous layer. The inner surface of the walls 310 of the bowl 300 may simply be formed of plastic as is customary in food processing appliances, or it may further comprise a coating of a similar frictional material to enhance the peeling process. The inside surface of the bowl may be coated in a material such as rubber, silicone, thermoplastic polymer (TPE) or other polymer to increase the coefficient of friction. The surface may also be patterned to provide formations which exert shear stresses on the cloves during rotation of the tool. As illustrated in FIG. 3, patterning formations may be provided, such as ribs 320, to enhance the friction of the inner surface of the walls 310. Such ribs 320 are often already present on existing food processing bowls, within which the invention can be implemented. The second friction surface 310 on the inner surface of the bowl does not need to give rise to a coefficient of friction higher than a typical food processing bowl, or indeed any other surface of the food processing appliance. It can still be considered a friction surface if it exerts a shear force on the foodstuff to be peeled, and does not significantly abrade the foodstuff.

The bowl 300 and lid 200 are preferably formed of a food-safe thermoplastic material, such that they can be easily formed and easily cleaned. The disc 110 is formed of a rigid food-safe metal or plastic material and coated with a material such as rubber, silicone, thermoplastic polymer (TPE) or other polymer which forms the friction surface 112. This coating may be fixed or it may be reversibly removable and attachable, such that it can be removed without damage and then replaced when desired. For example, the disc 110 may be formed as a grating surface or other form of food processing surface and provided with a replaceable coating to transform the upper surface to a friction surface. In this way the function of the disc can be reversibly transformed between different food processing functions. Also, if the friction surface becomes worn or split, it is easy to replace it with a new removable friction surface coating. The disc may also be made from a high friction material (such as high hardness TPE), so it can provide the friction surface by itself, without any additional components. The bowl 300, lid 200, and disc 110 are preferably all dishwasher-safe. Even if the replaceable coating itself is not placed in the dishwasher, this provides a configuration which is much easier to clean than resilient elements for peeling in the shape of a balloon or similar such deformable shape, which tend to collect water on the inside during cleaning.

The cover 400 is illustrated in FIG. 4 as pre-assembled on the shank insert 104, which is then attachable to the disc insert 102 by engagement of the splines 118 and components 114 and 124 (as described above). The cover 400 may be provided attached to the shank 120. Alternatively, the cover 400 may be provided as a separate component, which is attachable to a shank by sliding it over the shank while a formation (not shown) engages with the slit 122 on the shank. The shaft 116 and the disc insert 110 are preferably provided as a single integral component (the disc insert 102), as this simplifies manufacture and reduces production costs. However, the disc 110 may be provided as a separate component which is attachable to a shank. This may be preferable if, for example, the invention is to be implemented in a food processor.

Figure 5:
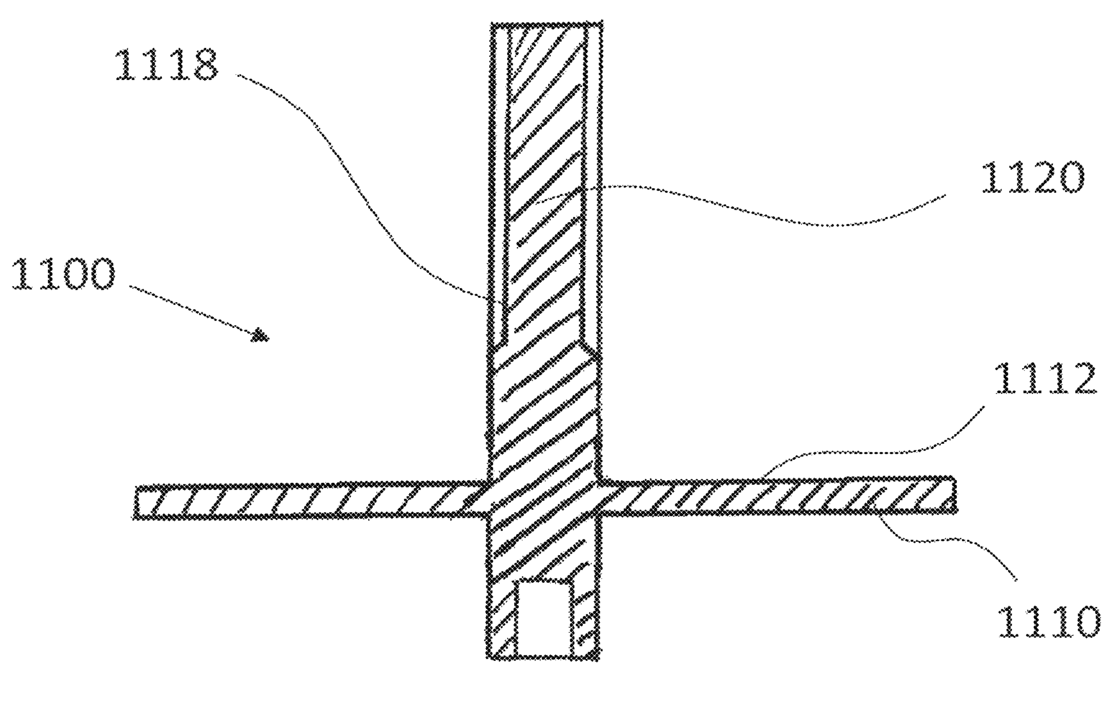
FIG. 5 shows a side-on drawing of an embodiment of the disc insert.

FIGS. 5 to 11 illustrate modified embodiments of the arrangement of the disc insert as a unitary component, which is attachable to a shank 120. FIG. 5 shows a simple insert 1100 which comprises a disc 1110 and a drive shaft 1120 as integral components. The upper surface 1112 of the disc forms a friction surface for the peeling of garlic or similar foodstuff. The drive shaft 1120 comprises slots 118, which can engage with splines within a drive shank for transmitting rotary drive. This illustrates an alternative to the arrangement in which the splines are be provided on the shaft and corresponding slots within the drive shank, as illustrated in FIGS. 1, 3 and 4.

Figure 6:
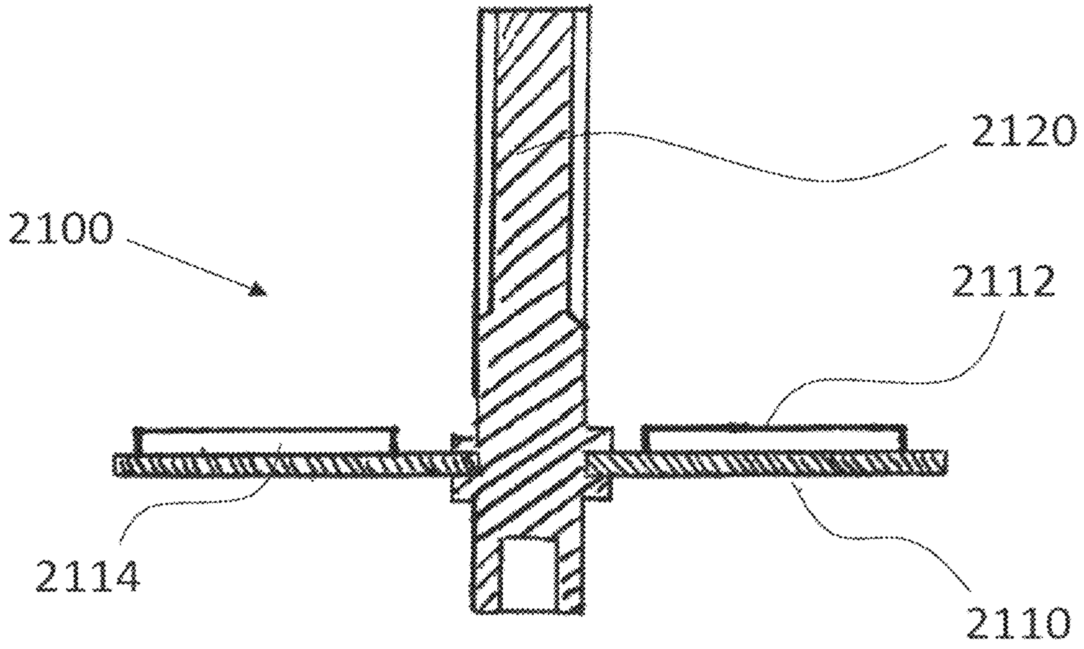
FIG. 6 shows a side-on drawing of a further embodiment of the disc insert.

FIG. 6 illustrates an embodiment of the invention in which the insert 2100 comprises a shaft 2120 and a disc 2110, which is formed from a rigid material. The upper surface 2112 of the disc 2110 comprises ribs 2114 or other structures which form the friction surface of the disc. The ribs 2114 or similar structures can improve the grip of the friction surface with the foodstuff. The ribs 2114 can also provide points of contact with the cloves which exert shear stresses on the outer surface, and therefore encourage peeling. This disc 2110 itself may be formed of stainless steel or a thermoplastic material.

Figure 7:
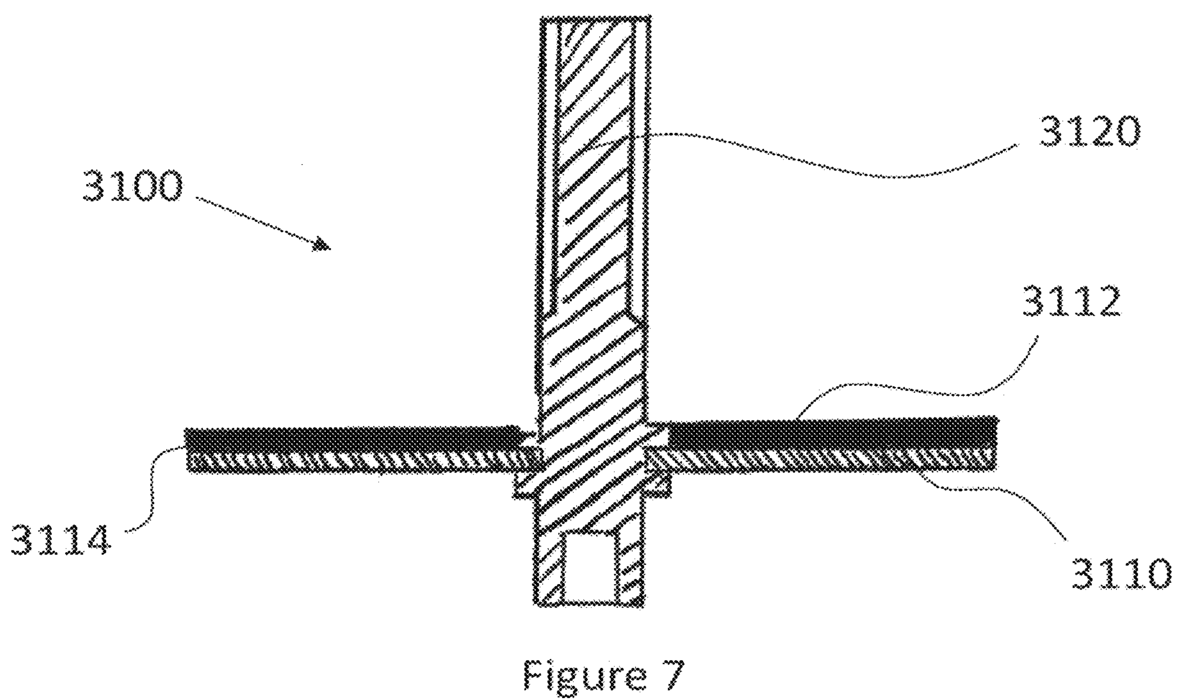
FIG. 7 shows a side-on drawing of a further embodiment of the disc insert.

FIG. 7 illustrates a further embodiment, in which the insert 3100 comprises a shaft 3120 and a disc 3110. The disc 3110 is formed of a rigid material while the upper surface 3112 has a coating 3114 formed of a resilient food-safe material, such as rubber, thermoplastic polymer (TPE) or silicone, which forms the friction surface 3112. The coating 3114 may be permanently attached to the disc 3110 (such that it is non-removable). This may, for example, be manufactured by over-moulding. Alternatively, the coating 3114 may be a separate entity in the form of a soft disc to be placed on top of the base disc 3110 with or without further fixation. The soft disc may optionally comprise scaffolding elements such as spokes and/or a ring of a more rigid material, to deter the cover from becoming detached during use.

Figure 8:
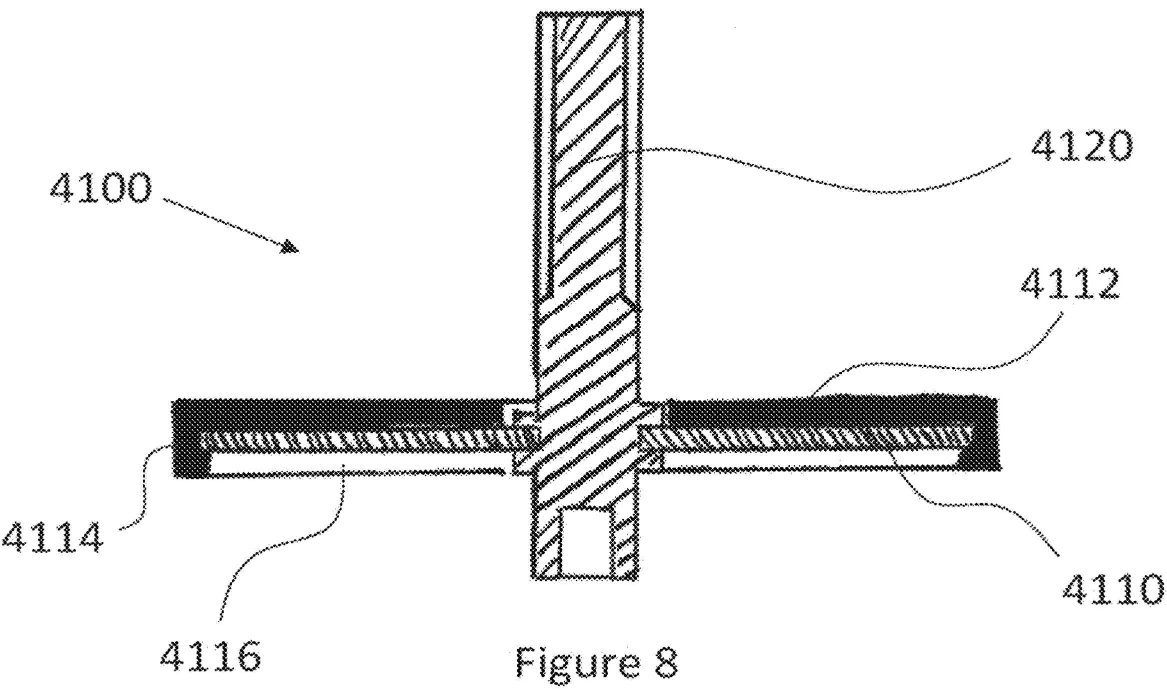
FIG. 8 shows a side-on drawing of a further embodiment of the disc insert.

FIG. 8 illustrates a similar example in which a coating 4114 is formed of a soft material and is removably attachable to the base disc 4110 by fitting it over the outer edge, for example by means of a snap fit. The base disc 4110 may have a secondary use, for example as a grating disc, which can be converted into a peeling disc by attachment of the soft cover. The disc 4110 and the cover 4114 may have corresponding apertures through which the skins can pass, but the garlic cloves cannot. As garlic cloves are typically 1 to 3 cm, the apertures preferably have an uninterrupted opening no greater than 1 cm. The apertures themselves may be smaller than 1 cm in any dimension, or grilles may be provided across the apertures at a spacing of 1 cm or less. The skins can then accumulate in the cavity 4116 under the disc, while the cloves remain above the disc 4110.

Figure 9:
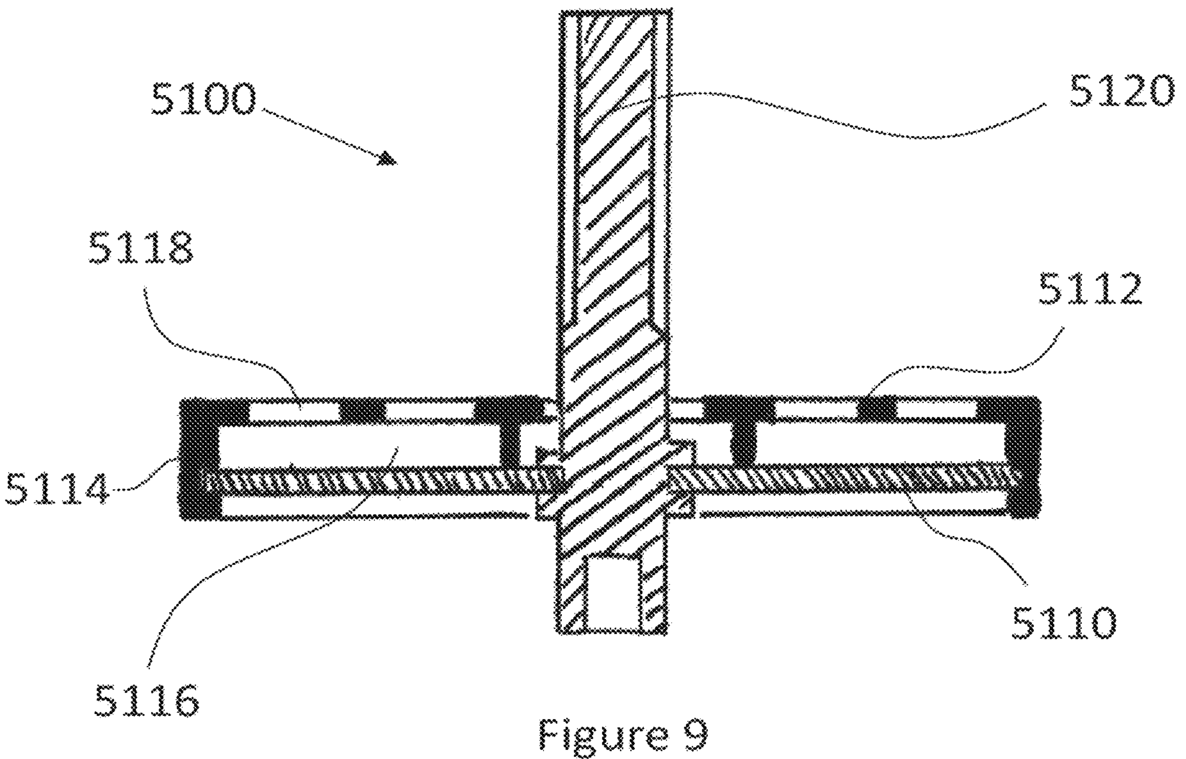
FIG. 9 shows a side-on drawing of a further embodiment of the disc insert.

In a slightly modified embodiment as illustrated in FIG. 9, the soft material 5114 is placed at a distance above the base disc 5110. Apertures 5118 are provided in the soft material 5114 but not in the disc 5110 itself. As such, the garlic skins fall through the apertures 5118 into the space between the soft material 5114 and the disc 5110, which forms a cavity 5116 for receiving the garlic skins. The skins can accumulate in the cavity 5116 and in this manner are separated from the peeled cloves.

Figure 10:
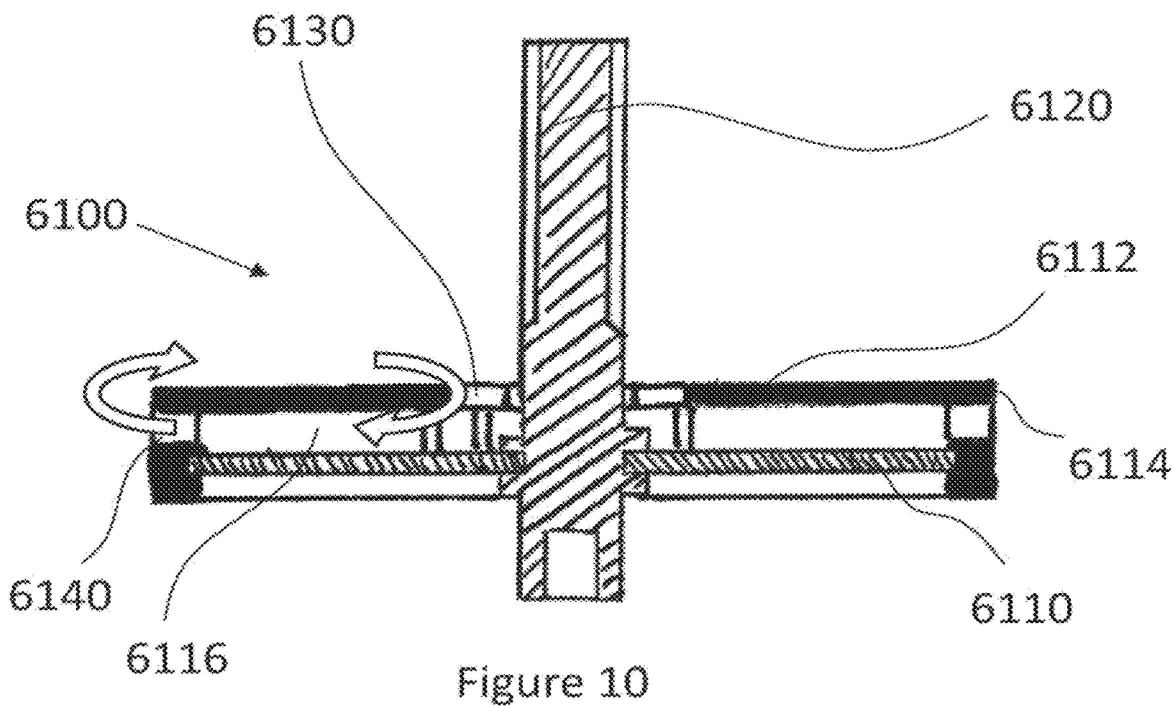
FIG. 10 shows a side-on drawing of a further embodiment of the disc insert.
Figure 11:
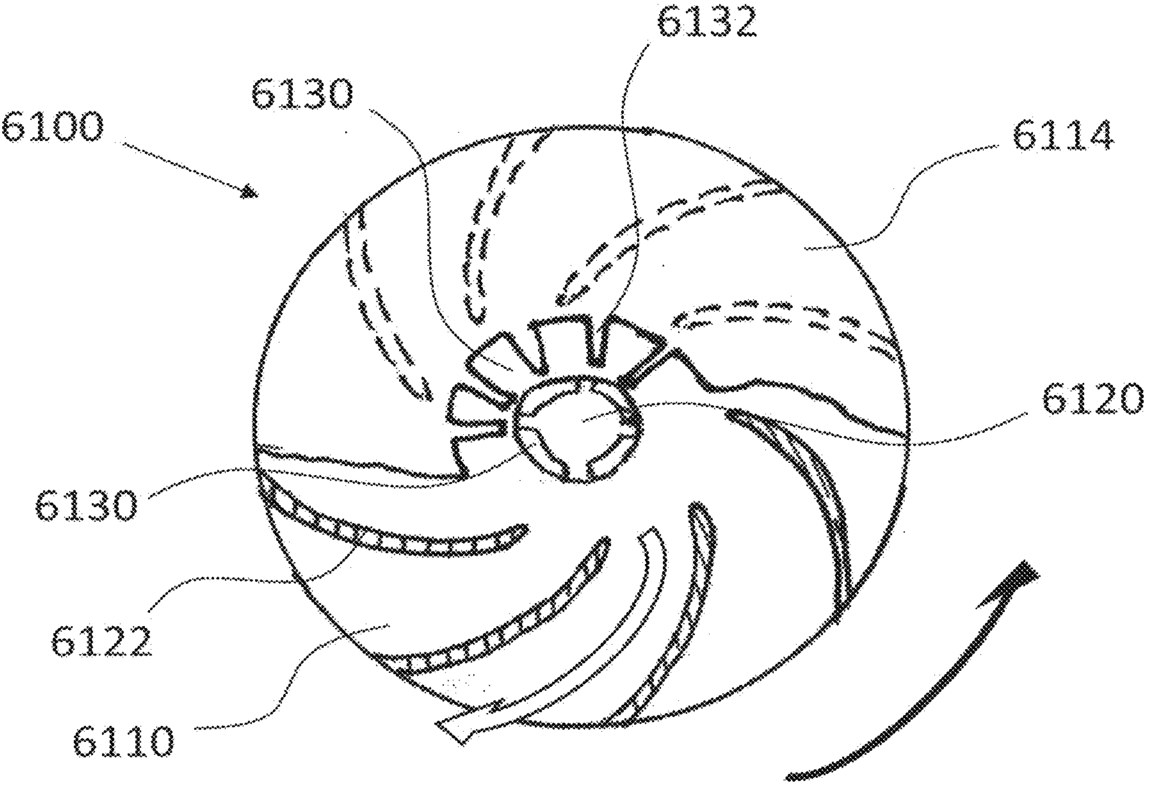
FIG. 11 shows a top-view drawing of the disc insert of FIG. 10.

A further slightly modified embodiment is illustrated in FIGS. 10 and 11, FIG. 11 providing a top-view of the insert 6100 of FIG. 10 with a break-out of the space between the soft material 6114 and the disc 6110, this space forming a cavity 6116. In this cavity 6116 there are also provided curved ribs 6122, which are shaped to act as a radial fan.

The ribs 6122 are curved away from the direction of rotation so that when the disc 6110 is rotating, the radial fan creates an air flow encouraging movement of air from the inner portion of the cavity 6116 to the outer portion. Inlet openings 6130 on the inner portion of the disc allow air from above the soft cover 6114 to enter the cavity 6116. The air can then flow across the cavity and exit through the outlet apertures 6140 positioned on an outer portion of the disc 6110. The outlets 6140 are preferably located on the peripheral edge of the disc 6110. Outlined arrows on FIGS. 10 and 11 indicate air flow while the filled-in arrow on FIG. 11 indicates direction of rotation of the disc 6110. This air flows assists in separating the garlic cloves from their skins. The cloves are pushed towards the outer walls of the container by centrifugal forces. The skins, however, are blown towards the inner portion of the disc 6110 by the air flow as they are much lighter. In this way, the cloves collect on the outer edges of the disc 6110 by the container walls while the skins collect on the inside along the shaft 6120. Grille elements 6132 are provided on the inlets 6130 to reduce the size of the opening and therefore prevent the skin fragments from being sucked into the cavity 6116. As the typical size of garlic cloves varies from 1 to 3 cm, the spacing between the grilles (uninterrupted opening) is typically preferably less than 1 cm. Grilles may also be provided on the outlets 6140, especially if they are located on the top surface of the disc 6110 rather than at the peripheral edge.

Figure 12A:
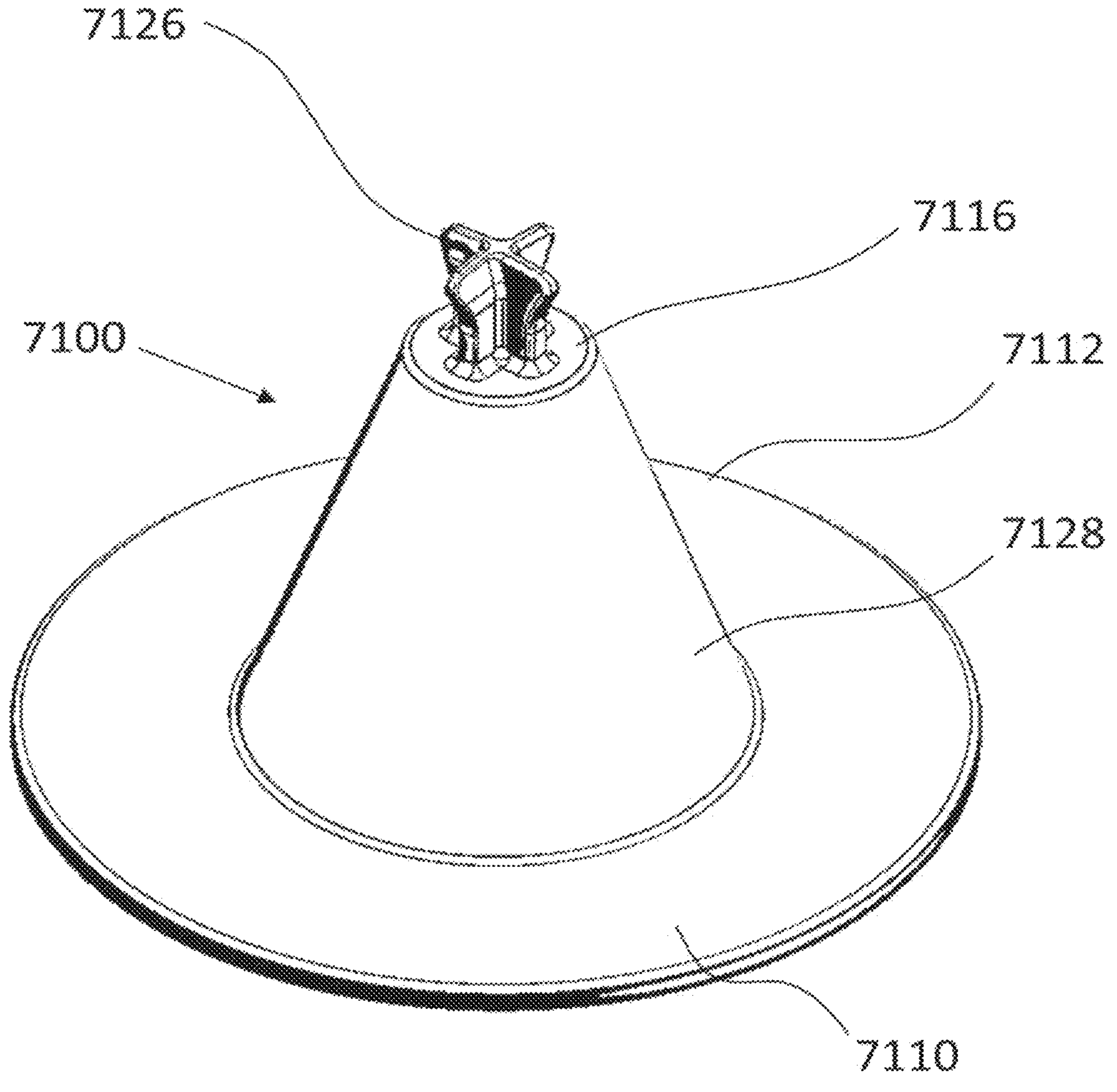
FIG. 12*a* shows a perspective view of an alternative disc insert.

Further alternatives are shown in FIGS. 12*a* to 12*e*. FIG. 12*a* shows a further insert 7100, which includes a conical portion 7128. The conical portion 7128 is arranged centrally on the disc 7110 and extends from the disc 7110 to cover substantially all of the shank 7116 (leaving just a formation 7126 for receiving drive to extend out of the top of the shaft 7116). The conical portion 7128 extends over roughly half of the diameter of the disc. The conical portion 7128 subtends an angle of around 10-115 degrees with the flat part of the disc 7110. The first friction surface 7112 extends over both the flat part of the disc 7110 and the conical portion 7128. The effect of providing such a conical portion is that the motion of foodstuff in a purradial direction may be reduced (or otherwise that the radial component of any motion of foodstuff is reduced). Such radial movement of the foodstuff may be undesirable as it may cause foodstuff to contact the second friction surface from a direction perpendicular to the second friction surface, which generally does not produce effective peeling and may cause damage to the foodstuff (e.g. by crushing part of the foodstuff).

Figures 12B, 12C:
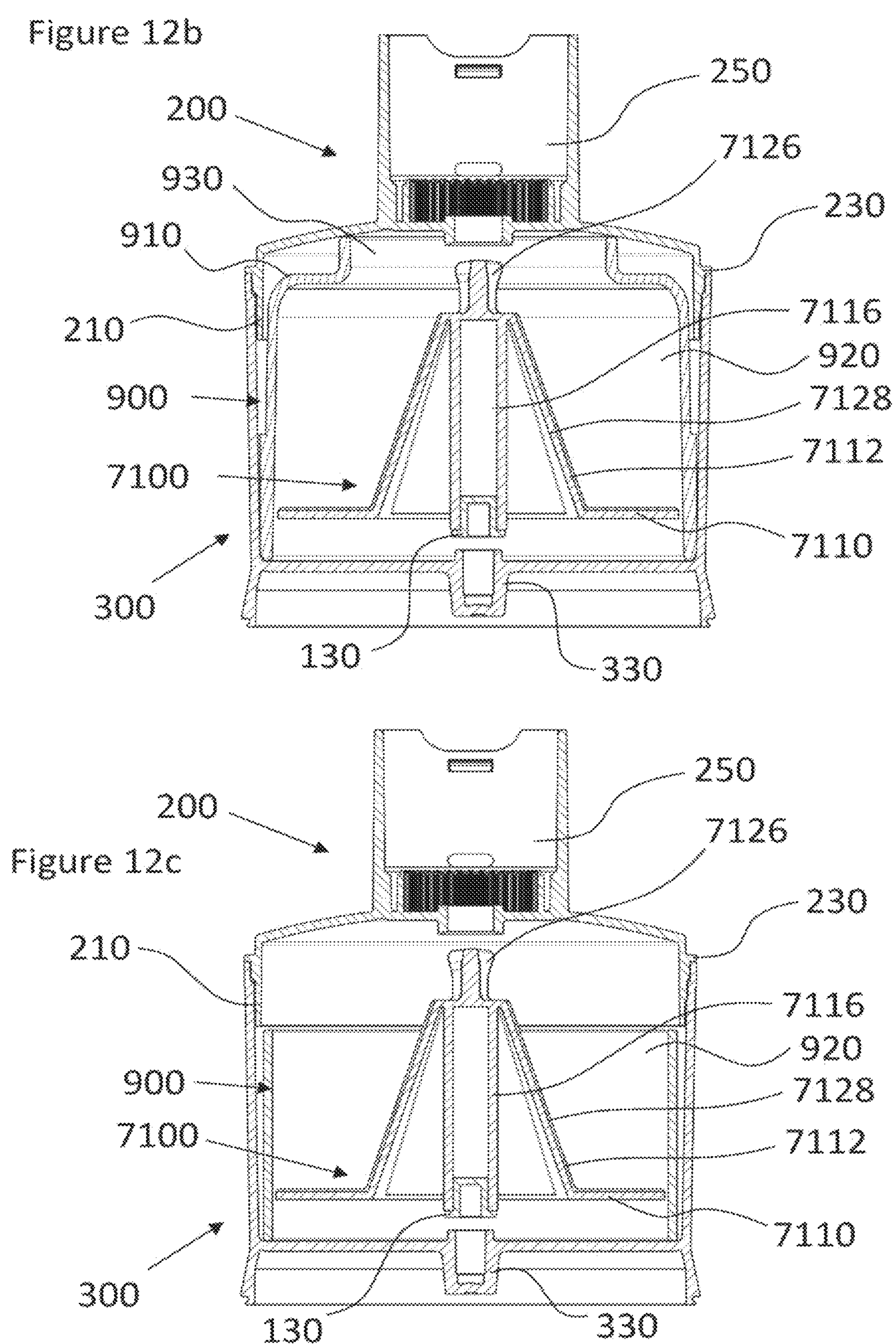
FIG. 12*b* shows a cross-sectional drawing of the food processing device including a sleeve and the disc insert of FIG. 12*a;*
FIG. 12*c* shows a cross-sectional drawing of the food processing device including an alternative sleeve and the disc insert of FIG. 12*a;*
Figure 12D:
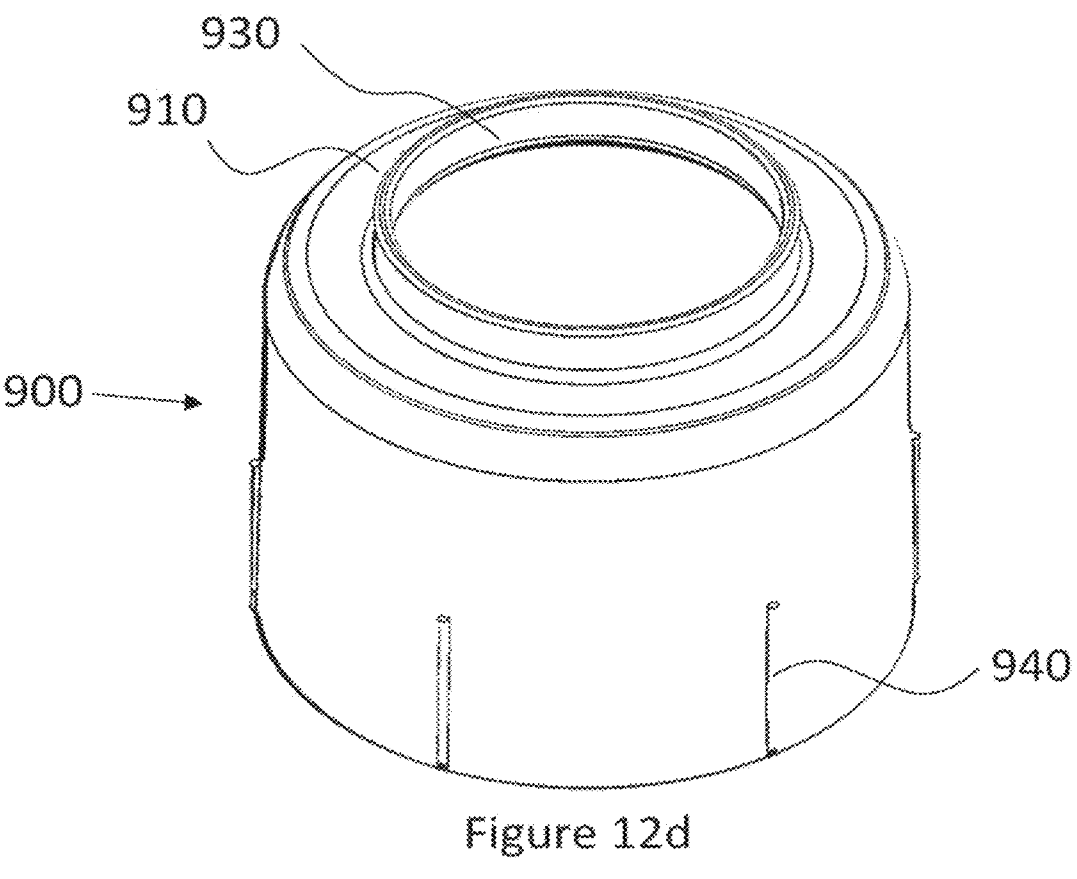
FIG. 12*d* shows a sleeve.

FIG. 12*b* shows the further insert 7100 mounted in the bowl 300 being enclosed by the lid 200. For clarity, the connections between the further insert 7100 and the transmission mechanism 250 and recess 330 at the base of the bowl 300 are not shown in the figure. Other than the inclusion of the further insert 7100, the arrangement depicted differs from that of FIG. 3 in that a removable sleeve 900 is provided between the wall of the bowl 300 and the further insert 7100. The sleeve 900 consists in main of a generally cylindrical wall which generally conforms to the wall of the surrounding bowl, where the inner surface of said wall of the sleeve acts as the second friction surface 920 rather than the wall of the bowl. The sleeve 900 comprises open top and bottom ends to allow the device to work without any other substantive modification from the arrangement already described. The further insert 7100 is used without a cover 400 (but in an alternative such a cover may be used).

The sleeve 900 shown in FIG. 12*b* (and also shown in FIG. 12*d*) is a rigid sleeve which includes a shoulder portion 910 and an upwardly standing wall 930 connected to the shoulder portion 910 and defining the upper open end of the sleeve. The use of such a shoulder portion 910 assists in conforming the sleeve to the shape of the bowl 300 and lid 200. The sleeve 900 forms a generally 'bell'-like shape and is configured simply to sit in place in the bowl 300. Optionally, locating features 940 are provided on the sleeve 900 and/or bowl 300 and/or lid 200 to assist in preventing the sleeve 900 from rotating with the further insert 7100 in use. For example, locating features 940 may be included on an outer part of the sleeve 900 to abut against ribs of a bowl 300 thereby to prevent rotation of the sleeve 900 in use.

Figure 12E:
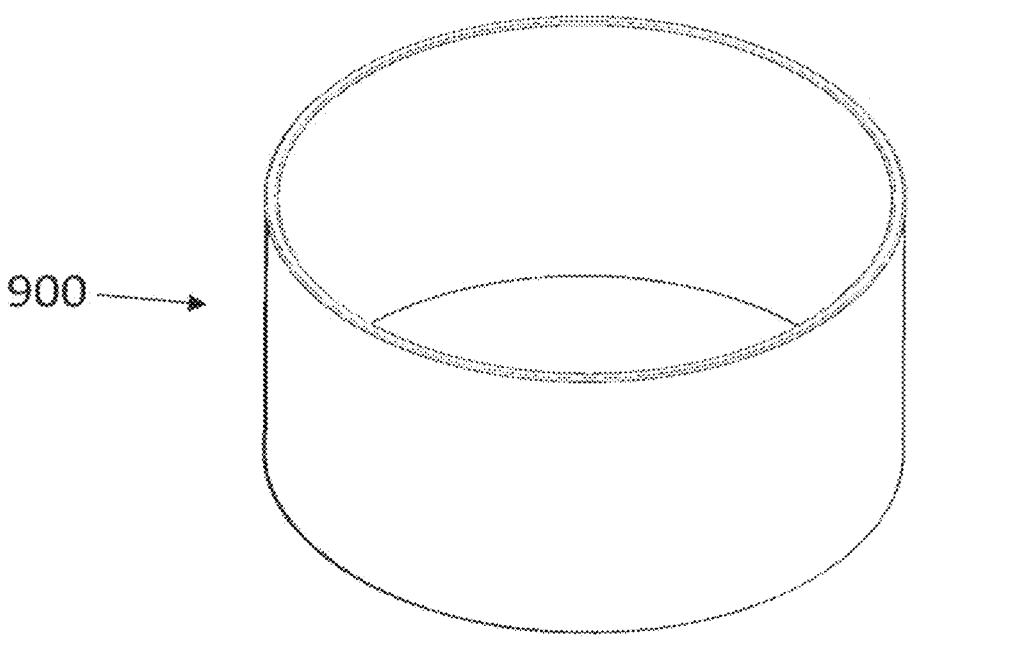
FIG. 12*e* shows an alternative sleeve.

Alternatively, as shown in FIGS. 12*c* and 12*e*, the sleeve 900 may be a soft and deformable sleeve which does not include a shoulder portion 910. This means the sleeve 900 may not extend the entire length of the shaft 7116, as shown in FIG. 12*c*. The deformable sleeve 900 may have a further use outside the device, in that it may be used manually to peel foodstuff in the manner of a known 'garlic roller' (in which foodstuff is placed in a deformable tube and is compressed by the user while the tube is rolled, causing the foodstuff to be peeled by friction).

The arrangements of FIGS. 5 to 12*c* are preferably implemented on an insert in which the disc is integral to the shank. However, they may also be implemented on an insert in which the disc is a separate component attachable to a shank of a food processing appliance. They may all be implemented in conjunction with a cover element as previously described.

In an alternative embodiment, the invention may be provided as an attachment for an existing food processing tool. For example, the disc may be an attachment which can be placed over a grater disc, dough hook or similar rotary tool to provide an upper friction surface. This can be attachable and removable by means of a snap fit connection. When the food processing tool is powered on, the disc rotates in the same manner. The garlic cloves are pushed to the outer edge of the bowl, and the skins are removed due to the interaction with the friction surface on the upper edge of the disc and the friction surface of the inner wall of the bowl. In this way, the attachment can convert the tool into one for peeling garlic cloves. This may be provided with a formation to act as the cover element. To increase safety, an interlock system may be included, which preferably determines whether drive is transmitted. For example, the interlock system prevents drive transmission when the lid 200 is not engaged with the bowl 300. For example, a push-rod within the lid 200 may be actuated by attachment of the lid 200 to the bowl 300, and in turn actuate a micro-switch associated with the hand blender 700 enabling activation of the motor of the hand blender 700. In another example, the transmission mechanism 250 of the lid 200 may include spring-clutch biased towards a disengaged (or neutral) position by e.g., a coil-spring, thus preventing transmission of drive when the lid 200 is not properly attached to the bowl 300. Attachment of the lid 200 to the bowl 300 may then actuate (e.g., via push-rods) the spring-clutch to engage and enable transmission of drive from the hand-blender 700 through the transmission mechanism 250.

Whilst the tool 100 is described above as being powered by a separable hand-blender 700, the tool 100 may instead be powered by a motor unit formed integrally with the lid 200. This cheaper and more simple configuration is known as a "mini-chopper". In another alternative, other than a hand blender 700 being used, a hand-mixer may instead be used, in which case the tool 100 would be driven from the apertures typically used to receive and drive whisk-spindles.

The control mechanism of the tool 100 (e.g., control 750) may be used to either activate the motor that drives the tool 100 either in "pulse" mode where the tool 100 is only driven as long as the user actuates a control (e.g., holds down a button) or in a continuous mode (where the motor is activated by a user interaction and remains on until the user interacts again with the controller to deactivate it). Continuous mode is advantageous in that the user need not interact continuously with the controls but can go away and perform other tasks. Pulse setting is particularly advantageous for brief tasks where over-processing of food should be avoided, and also increases safety, as the motor is deactivated as soon as the user stops e.g., pressing a button. The user may therefore visually confirm the progress of garlic peeling and cease pressing the button (e.g., control 750) as soon as they see it is done, or if conditions become unsafe. It may therefore be desirable that, where the control 750 is capable of entering a continuous mode as well as a pulse mode, the above-described interlock system prevents the control 750 from being able to enter the continuous mode when the tool 100 or lid 200 is attached to the hand blender 700. As such, an interlock system may control how drive is transmitted, preferably preventing drive transmission in continuous mode when the tool 100 is engaged with the motor, and/or preferably only enabling drive transmission in pulse mode when the tool 100 is engaged with the motor. In some examples, however, the control 750 may be configured such that it is only capable of entering a "pulse" mode and is not capable of entering continuous mode at all.

The invention can also be implemented in food processing appliances other than hand blenders or immersion blenders. For instance, a peeling insert according to the invention may be modified to act as an attachment for a blender, food processor or stand mixer, and may be powered from below.

Ejection Button

Figure 13:
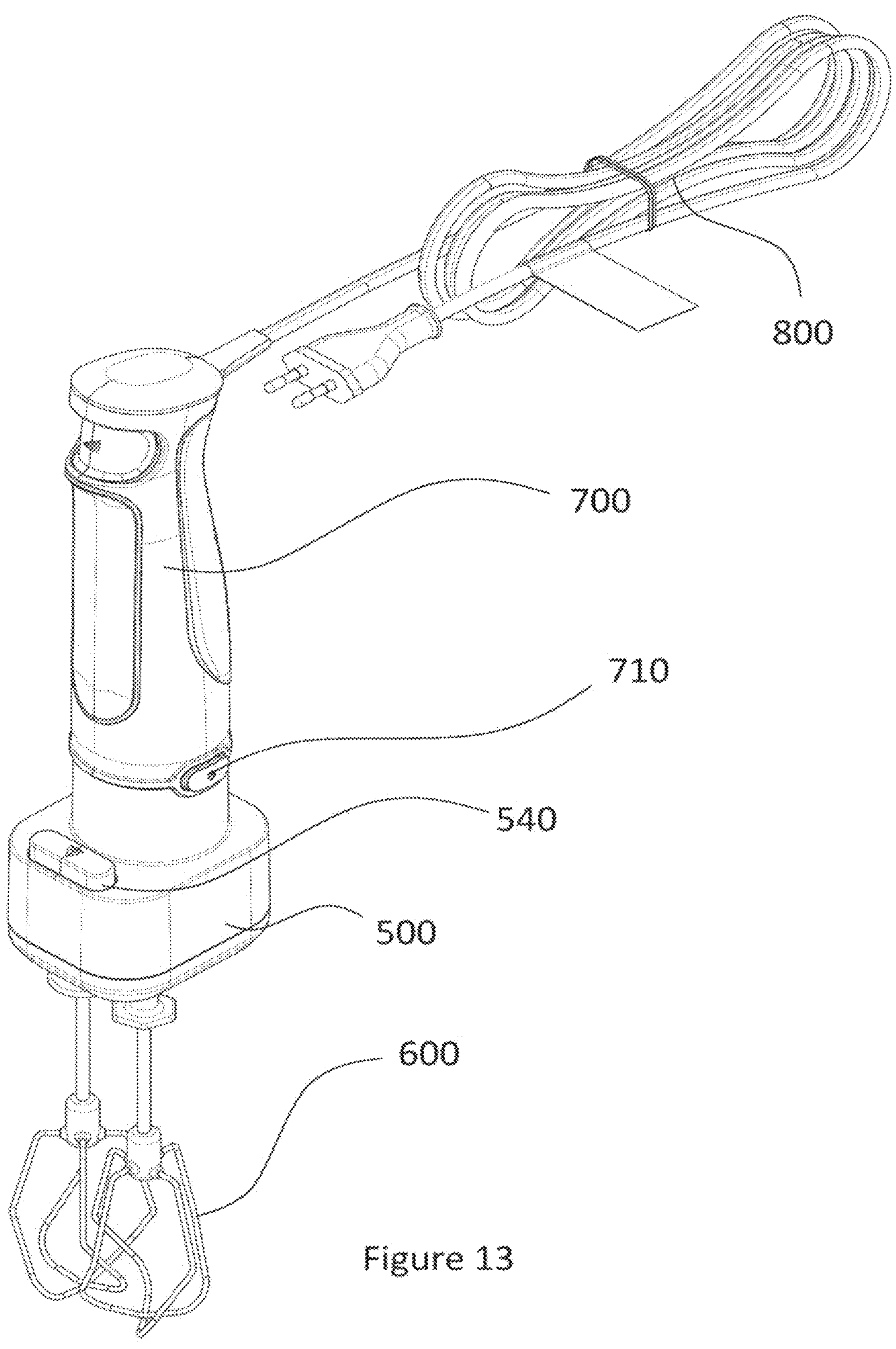
FIG. 13 shows a perspective view of a hand blender with a beater attachment connected.

FIGS. 13 to 19 illustrate a further attachment 500 for a hand blender or immersion blender. FIG. 13 shows a perspective view of the attachment 500 connected to the handle 700 of a hand blender. The hand blender 700 is connectable to a power source via a cable 800 and comprises a motor. The attachment 500 can be ejected from the hand blender 700 by pressing an attachment release button 710. The attachment 500 holds and operates a tool 600 (the example of two beaters is illustrated), which can be ejected from the attachment 500 by activating a tool ejector button 540. Accordingly, the ejection of the attachment 500 from the hand blender 700 is a separate action and has a separate mechanism than the ejection of the tool 600 from the attachment 500.

Figures 14, 15:
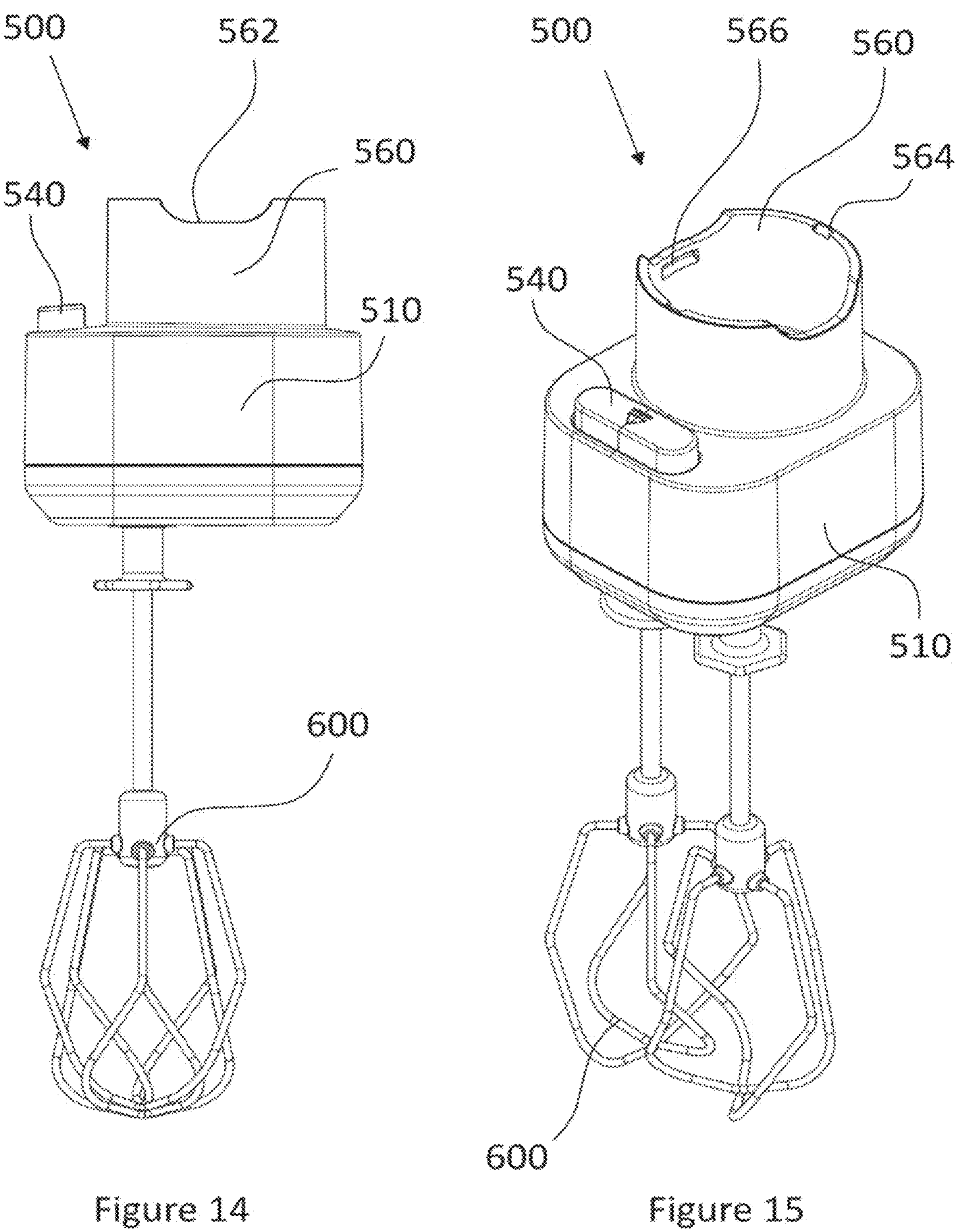
FIG. 14 shows a side view of an embodiment of a hand blender attachment.
FIG. 15 shows a perspective view of the hand blender attachment of FIG. 14.

FIGS. 14 and 15 provide side and perspective views of the attachment 500 with the tools 600 attached. In a similar manner as that described previously, the shaft or handle of a hand blender 700 contains a motor, fits within a channel 560 on the attachment, and engages with a transmission mechanism 520 (shown in FIGS. 16 and 17). The hand blender 700 is secured within the channel 560 by means of corresponding engagement formations, such as one or more apertures 566, and/or notches 564 for receiving corresponding formations on the blender shaft 700. The blender shaft may be attached by a bayonet and/or snap fit mechanism. There are two attachment release buttons 710 on either side of the handle 700 and the user squeezes them together. This motion disengages the bayonet and/or snap fit mechanism and thereby releases the attachment 500 from the blender shaft. The lip of the channel 560 comprises curved surfaces 562 for accommodating the attachment release buttons 710.

Figures 16, 17:
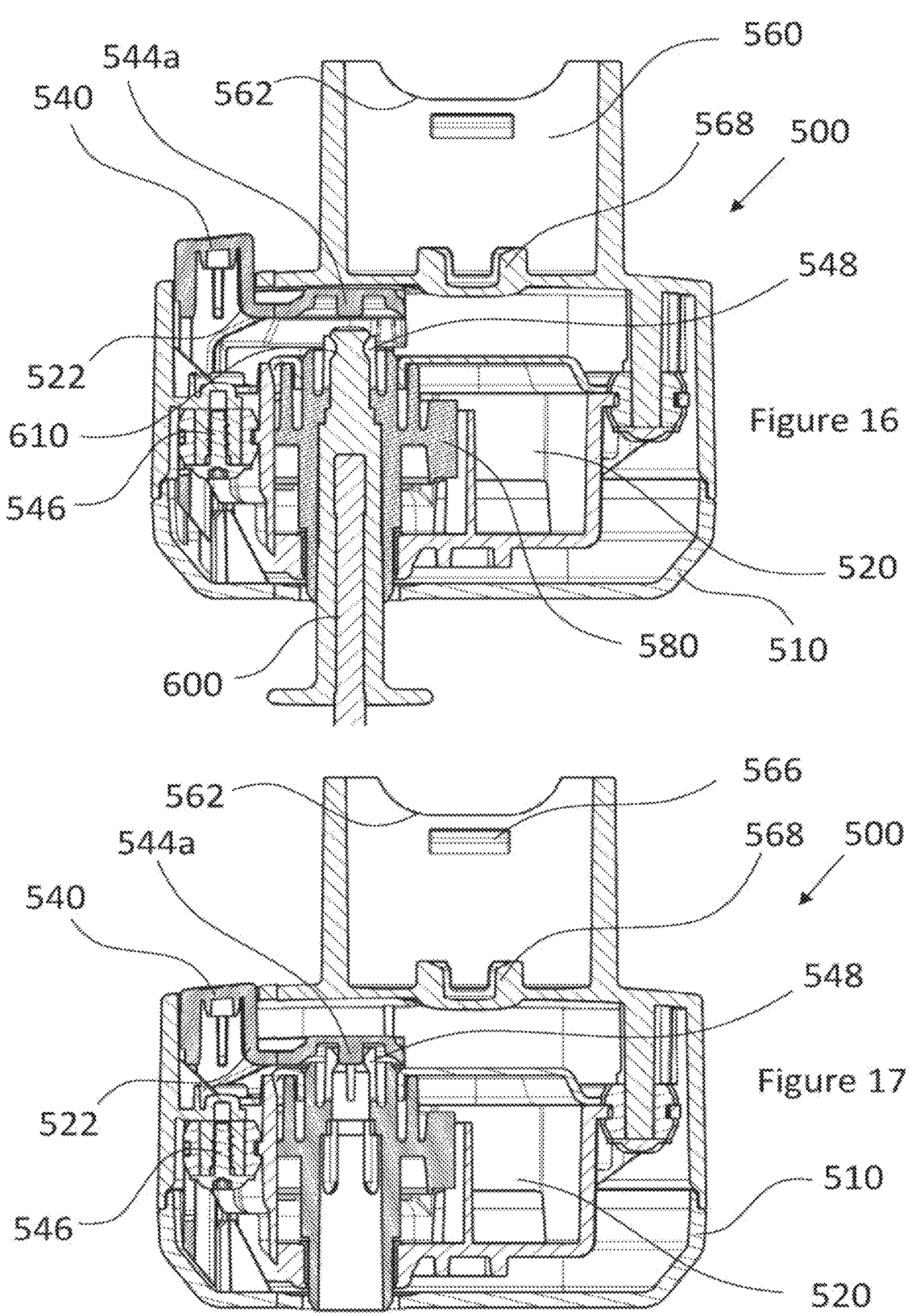
FIG. 16 shows a cross-sectional side view of the hand blender attachment of FIGS. 14 and 15 with the tool attached.
FIG. 17 shows a cross-sectional side view of the hand blender attachment of FIGS. 14 to 16 without the tool attached.

FIGS. 16 and 17 provide cross-sectional views of the attachment 500. The drive shaft can be accommodated within receiving tabs 568 at the base of the receiving channel 560. The attachment 500 comprises a transmission mechanism 520 which engages with the motor in the hand blender shaft 700, the transmission 520 comprising a gear 580 within which the tool 600 is received. These components transmit rotary motion to the attachment tool(s) 600. Tools such as beaters, as illustrated, whisks or similar can be attached and detached to and from the attachment 500.

The tools 600 typically comprise an axle, on one end of which is a food processing formation. The other end of the tool 600 comprises a groove 610 running around the shaft of the axle. The radius of the axle is reduced at the groove, and then increases at the end of the axle. The tools 600 are attached to the attachment 500 by a snap connection between snap hooks 548, located on rotating gears 580 of the transmission mechanism 520, and the grooves 610 on the tools 600. The tools 600 can be detached by pressing button 540, which is positioned on the upper surface of the attachment 500. The mechanism by which the button 540 releases the tools 600 from the gear 580 is illustrated in FIGS. 16 and 17. The button 540 protrudes through the attachment housing 510 and is moveable in a direction parallel to the axis of rotation of the tools 600. The button 540 is formed as part of an ejector element 522 which transmits axial force from the button 540.

The ejector element further comprises two pins **544*a*, 544*b*. These two pins 544*a*, 544*b* are positioned directly above each of the tools 600. When a user presses the button 540, the force is transmitted by the element 522 to the pins 544*a*, 544*b*, which then apply an axial force on the tools 600. This axial force pushes the tools 600 out of the snap connection and releases them from the transmission mechanism 520. In this manner, the user can release the tools 600** without needing to touch them directly. Additionally, the mechanism for ejection of the tools from the attachment is separate from the mechanism for ejection of the attachment from the motor source. This can improve safety as the detachments can be more carefully controlled and undertaken sequentially rather than simultaneously.

The pins **544*a*, 544*b* move in the ejection direction, which is aligned with the axis of the tool(s) 600. However, the button 540 is not aligned with the tool(s) 600. The button 540 and the pins 544*a*, 544*b* move in parallel directions, but their vectors of movement are offset from one another. Both the position of the button 540 and its activation direction are offset from the axis of the tool(s) 600**, in that they are not aligned with the axis of the tools.

Figure 19:
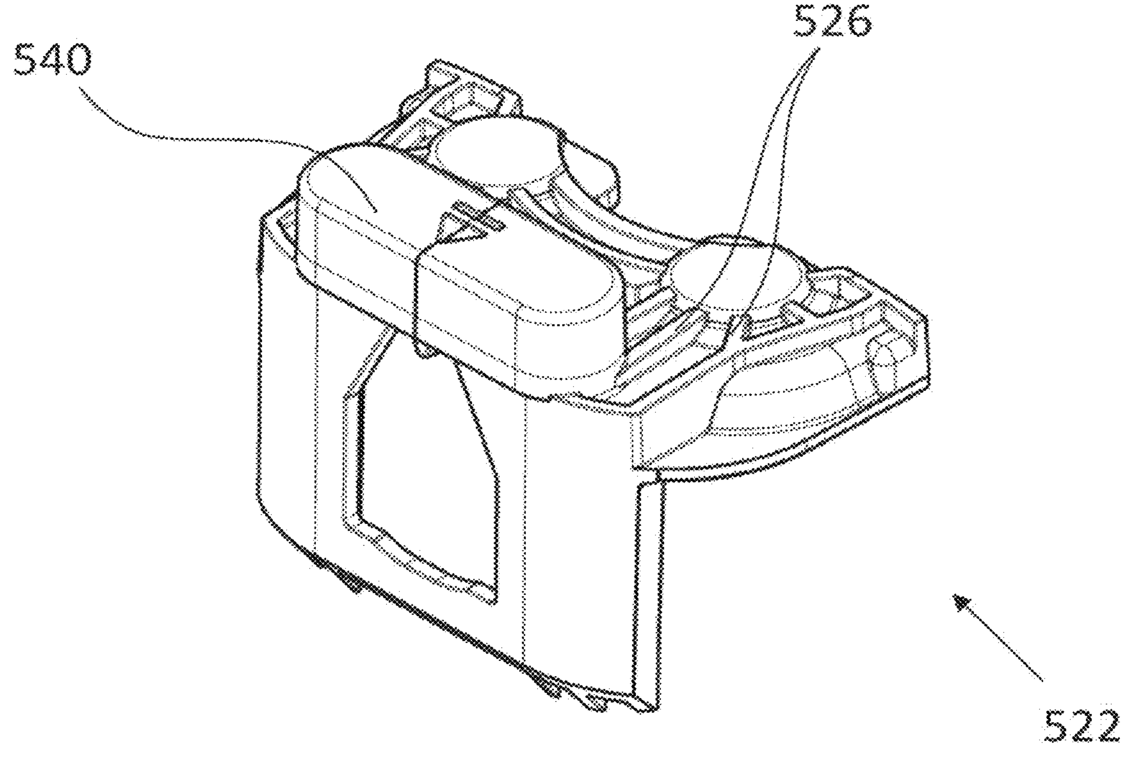
FIG. 19 shows a perspective view of the outer surface of the button element of the hand blender attachment of FIGS. 14 to 18.

In this way, the ejection mechanism can be fitted around any transmission mechanism and tools as required. As such, the presence of an ejection button does not prevent the attachment being useable in conjunction with existing devices. For example, in some existing appliances the tools may be aligned with the motor. However, in this arrangement tilting moments can occur. In order to compensate for this, the ejection element 522 comprises ribs 524 on the front wall in the vicinity of the button 540. As the button 540 is pressed, these ribs 524 guide and stabilize the movement of the button 540 and element 522 within the housing of the gear box 520. The button 540 and the pins **544*a*, 544*b* then move downwards smoothly with minimal or no tilting or rotation. Although ribs 524 are used in this embodiment, it should be understood that any guiding element may be used which is sufficiently long to compensate for the tilting moment. The ejection element may preferably further comprise struts 526 which run perpendicular to the ejection direction, between the button 540 and the pins 544*a*, 544*b* as illustrated in FIG. 19. These act to strengthen and improve the stiffness of the ejection element 522** to inhibit plastic deformation as a result of shear stresses. The use of struts is preferable to increasing thickness or density of the element as a whole, so that the weight and volume of the element can be minimized.

The button 540 is preferably located on the surface opposite to the entry point of the tools (the side on which the tools are located), so that the direction in which the button is pressed is the same as the direction of movement required to release the tools. Other release controllers may be used, such as levers or sliding buttons. These may be placed on a side surface of the attachment 500 and the mechanism pushed or slid downwards to release the tools so that the actuation direction is parallel to the ejection direction.

Figure 18:
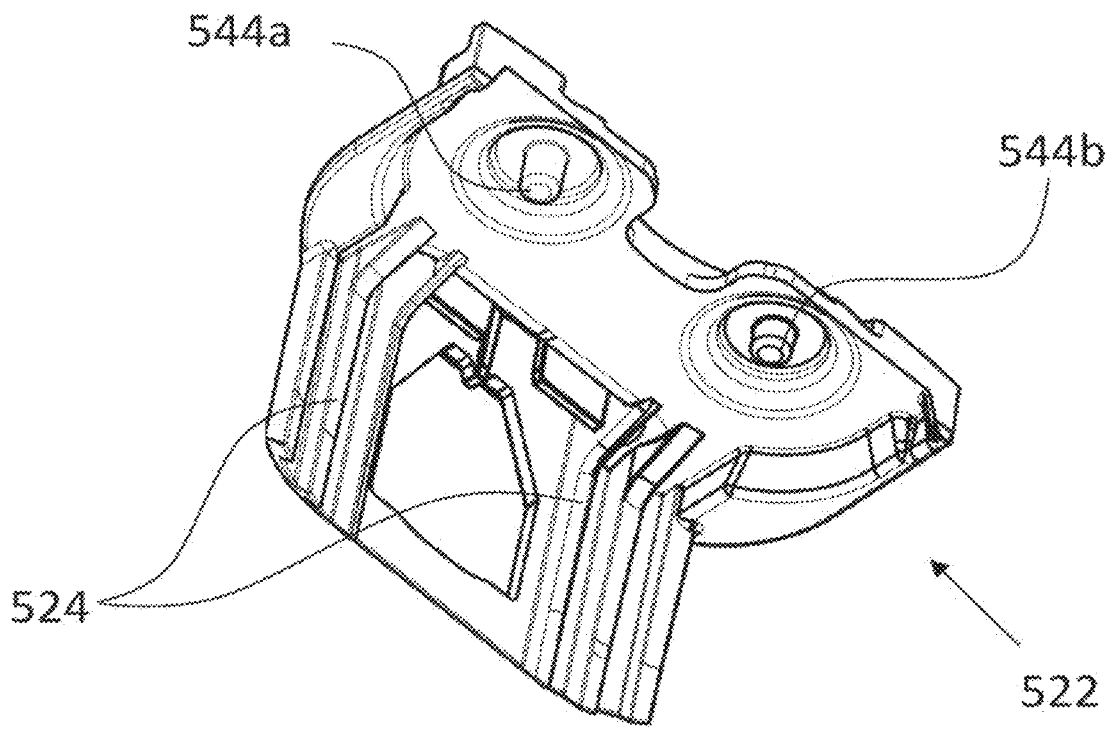
FIG. 18 shows a perspective view of the inner surface of the button element of the hand blender attachment of FIGS. 14 to 17.

In some embodiments, the two pins 544*a*, 544*b* have different lengths, as illustrated in FIG. 18. This has the effect that the pins 544*a*, 544*b* do not engage the tools 600 at the same time. As such, the force required by a user to eject the tools 600 is reduced as the user does not need to eject them simultaneously. The invention may alternatively be implemented on a tool attachment which only attaches one tool, for example a balloon whisk.

In the illustrated embodiment, the button 540 is in contact with a resilient element 546 (either directly or via intermediary elements). Resilient element 546 presses on the button 540 and biases it into an upper position away from the surface of the housing 510. In alternative embodiments the button may be biased in a lower position and only raised to a higher level above the surface of the housing 510 when the tools are connected into the gear 580.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A kitchen appliance comprising a motor unit, and an attachment for the kitchen appliance, the attachment comprising:

a coupling to removably attach the attachment to the kitchen appliance, the coupling configured to transmit drive from the motor to the attachment, a drive transmission mechanism comprising a gear box arranged to engage with the motor via the coupling, and to provide rotary drive to a drive outlet of the attachment, a removably attachable tool connectable to the drive outlet, the tool having an elongated axle extending away from the attachment and carrying a food processing formation at a distal end thereof, whereby a proximal end of the axle of the tool can be detached from the attachment, and an ejector actuable to detach the removably attachable tool from the attachment, wherein the kitchen appliance further comprisesing a further ejector actuable to detach of the attachment from the kitchen appliance, wherein:

the further ejector is separate from the ejector for the removably attachable tool;

the further ejector is spaced apart from the ejector for the removably attachable tool; and the direction of actuation of the further ejector is different from the direction of actuation of the ejector for the removably attachable tool, the arrangement being such that the further ejector is actuable to release the attachment from the motor unit, and the ejector is actuable subsequently to release the tool from the attachment.

2. The attachment of claim 1, wherein the reversibly attachable tool and the ejector for the reversibly attachable tool are provided on opposite faces of the attachment.

3. The attachment of claim 1, wherein the reversibly attachable tool is ejected along an ejection direction, and the ejector for the reversibly attachable tool comprises an ejection controller activated in an activation direction, the activation direction being parallel to the ejection direction.

4. The attachment of claim 3, wherein the activation direction is offset from the ejection direction.

5. The attachment of claim 1, wherein the ejector for the reversibly attachable tool further comprises an ejection pin for each component part of the tool, preferably wherein the ejector for the reversibly attachable tool comprises two ejection pins, more preferably wherein the tool comprises two component parts, optionally a first ejection pin having a different length than a second ejection pin.

6. The attachment of claim 1, wherein the ejector for the reversibly attachable tool further comprises a guiding formation parallel to the ejection direction, preferably wherein the guiding formation comprises ribs in a direction parallel to the ejection direction, even more preferably wherein the guiding formation is aligned with the activation direction.

7. The attachment of claim 6, wherein the guiding formation further comprises struts, preferably in a direction perpendicular to the ejection direction.

8. The attachment of claim 1, wherein the ejector for the reversibly attachable tool comprises an ejector button, and a biasing means configured to bias the ejector button against an ejection direction, preferably towards an upper position and/or away from a surface of the attachment.

9. The attachment of claim 1, wherein the ejector for the reversibly attachable tool comprises an ejector button, and a biasing means configured to bias the ejector button in the ejection direction, preferably towards a lower position from which the button is moved to an upper position when the reversibly attachable tool is attached to the attachment.

10. The kitchen appliance of claim 1, wherein the coupling comprises a formation configured to engage with a formation of the kitchen appliance to removably attach the attachment to the kitchen appliance.

11. The kitchen appliance of claim 10, wherein the coupling means comprises a bayonet and/or snap fit mechanism; and/or wherein the further ejector comprises a release button, preferably a pair of release buttons arranged to be squeezed together.

12. A kitchen appliance comprising:

an elongated appliance body comprising a motor;

an attachment body comprising a coupling configured to removably attach the attachment body to the appliance body, and to transit drive from the kitchen appliance to the attachment, the attachment body comprising a gearbox and a drive outlet;

a tool having an elongated axle carrying a food processing formation at a distal end thereof, the tool attachable to the drive outlet and extending away from a lower surface of the attachment body;

a first ejector device configured to selectively detach the attachment body from the appliance body; and a second ejector device configured to selectively detach a proximal end of the axle of the tool from the attachment body; wherein the first ejector device is spaced apart from the second ejector device and has a different direction of actuation configured such that the first ejector device is actuable to detach the attachment body before the second ejector device is actuated to detach the tool from the attachment body.

13. The kitchen appliance of claim 12 wherein:

the appliance body has a distal annular end portion and the attachment body has a proximal annular end portion configured to removably attach the attachment body to the appliance body.

14. The kitchen appliance of claim 12 wherein the first ejector device is located on the distal annular end portion of the appliance body or the proximal annular end portion of the attachment body; and where in the second ejector device has a button located on a surface of the attachment body.

15. The kitchen appliance of claim 14 wherein the second ejector device includes a member radially inwardly extending for selectively engaging the tool, configured to disengage the tool from the attachment body when the button is pressed.

* * * * *